United States Patent
Tong et al.

(10) Patent No.: US 11,727,540 B2
(45) Date of Patent: Aug. 15, 2023

(54) IMAGE SHARPENING

(71) Applicant: Samsung Electronics Co., Ltd., Suwon-si (KR)

(72) Inventors: Zhen Tong, Allen, TX (US); Yibo Xu, Plano, TX (US); John W. Glotzbach, Allen, TX (US); Hamid R. Sheikh, Allen, TX (US); Ruiwen Zhen, Allen, TX (US); Baekdu Choi, West Lafayette, IN (US)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 17/139,880

(22) Filed: Dec. 31, 2020

(65) Prior Publication Data
US 2022/0207658 A1 Jun. 30, 2022

(51) Int. Cl.
*G06T 5/00* (2006.01)
*G06T 7/13* (2017.01)
(Continued)

(52) U.S. Cl.
CPC ............... *G06T 5/003* (2013.01); *G06T 5/002* (2013.01); *G06T 5/009* (2013.01); *G06T 5/20* (2013.01);
(Continued)

(58) Field of Classification Search
CPC ......... G06T 5/003; G06T 5/002; G06T 5/009; G06T 5/20; G06T 5/50; G06T 7/13;
(Continued)

(56) References Cited

U.S. PATENT DOCUMENTS

| 6,173,085 B1 * | 1/2001 | Hamilton, Jr. ............ G06T 7/12 345/611 |
| 7,809,208 B2 | 10/2010 | Kang |

(Continued)

FOREIGN PATENT DOCUMENTS

| EP | 2975850 A1 | 1/2016 |
| JP | 6111489 B2 | 4/2017 |

(Continued)

OTHER PUBLICATIONS

International Search Report and Written Opinion of the International Searching Authority regarding International Patent Application No. PCT/KR2021/020345 dated Apr. 14, 2022, 9 pages.

(Continued)

*Primary Examiner* — Jose L Couso

(57) ABSTRACT

Various image sharpening techniques are disclosed. For example, a method for image sharpening includes obtaining, using at least one sensor of an electronic device, an image that includes visual content. The method also includes generating an edge map that indicates edges of the visual content within the image. The method further includes applying a high-pass signal and an adaptive gain based on the edge map to sharpen the image. The method also includes generating a bright halo mask and a dark halo mask based on the edge map, where the bright halo mask indicates an upper sharpening limit and the dark halo mask indicates a lower sharpening limit. In addition, the method includes modifying a level of sharpening at one or more of the edges within the sharpened image to provide halo artifact reduction based on the bright halo mask and the dark halo mask.

36 Claims, 25 Drawing Sheets

(51) Int. Cl.
*G06T 5/50* (2006.01)
*G06T 5/20* (2006.01)

(52) U.S. Cl.
CPC ............... *G06T 5/50* (2013.01); *G06T 7/13* (2017.01); *G06T 2207/20192* (2013.01); *G06T 2207/20208* (2013.01); *G06T 2207/20221* (2013.01)

(58) Field of Classification Search
CPC . G06T 2207/20192; G06T 2207/20208; G06T 2207/20221; G06T 5/004; G06T 7/10; G06T 7/12; G06T 7/44; G06T 9/2013; H04N 2201/00; H04N 5/23229; H04N 1/409; H04N 1/4095; H04N 1/58
See application file for complete search history.

(56) References Cited

U.S. PATENT DOCUMENTS

| | | | |
|---|---|---|---|
| 9,374,478 B1* | 6/2016 | Li | H04N 1/6072 |
| 9,412,152 B2 | 8/2016 | Chen et al. | |
| 9,560,290 B2 | 1/2017 | Jo et al. | |
| 9,883,112 B1* | 1/2018 | Igor' Valer'Evich | H04N 5/23245 |
| 9,883,125 B2 | 1/2018 | Li et al. | |
| 10,074,162 B2* | 9/2018 | El Mezeni | G09G 3/2007 |
| 10,453,185 B2 | 10/2019 | Dal Mutto et al. | |
| 10,853,926 B2 | 12/2020 | Tokizaki et al. | |
| 11,599,973 B2* | 3/2023 | Ida | H04N 25/61 |
| 2004/0057630 A1* | 3/2004 | Schuhrke | H04N 1/4072 382/254 |
| 2008/0030587 A1 | 2/2008 | Helbing | H04N 5/23248 348/208.4 |
| 2008/0298712 A1* | 12/2008 | Kang | H04N 5/23229 382/266 |
| 2008/0317378 A1* | 12/2008 | Steinberg | G06V 10/30 348/E5.081 |
| 2009/0034863 A1* | 2/2009 | Kisilev | G06T 5/20 382/275 |
| 2010/0002952 A1* | 1/2010 | Oizumi | G06T 5/004 382/266 |
| 2011/0123133 A1* | 5/2011 | Mohanty | G06T 5/009 382/274 |
| 2011/0149163 A1* | 6/2011 | Nishi | H04N 5/23267 348/E5.022 |
| 2012/0281132 A1* | 11/2012 | Ogura | G06T 5/003 348/E5.045 |
| 2014/0176592 A1* | 6/2014 | Wilburn | G06T 5/00 345/589 |
| 2014/0185952 A1* | 7/2014 | Cabral | G06T 5/004 382/263 |
| 2014/0307978 A1* | 10/2014 | Balestrieri | G06T 5/20 382/263 |
| 2014/0341481 A1* | 11/2014 | Panetta | G06T 5/50 382/284 |
| 2015/0036943 A1* | 2/2015 | Lin | G06T 3/4053 382/254 |
| 2016/0140697 A1* | 5/2016 | Sugimoto | H04N 5/225 348/241 |
| 2017/0061586 A1* | 3/2017 | Uliyar | G06T 5/003 |
| 2017/0061590 A1* | 3/2017 | Chamaret | G06T 5/009 |
| 2017/0064204 A1* | 3/2017 | Sapiro | H04N 5/23245 |
| 2018/0114296 A1* | 4/2018 | Chuang | G06T 5/002 |
| 2019/0213383 A1 | 7/2019 | Matsunami | |
| 2019/0213717 A1* | 7/2019 | Oniki | G06T 5/20 |
| 2019/0385288 A1* | 12/2019 | Stewart | G06T 5/002 |
| 2020/0265567 A1 | 8/2020 | Hu et al. | |
| 2021/0152735 A1* | 5/2021 | Zhou | H04N 5/247 |
| 2021/0281813 A1* | 9/2021 | Vyas | G06T 5/002 |
| 2022/0005157 A1* | 1/2022 | Shu | G06T 3/4069 |

FOREIGN PATENT DOCUMENTS

| | | |
|---|---|---|
| JP | 6500638 B2 | 4/2019 |
| JP | 2019121187 A | 7/2019 |
| WO | 2020231065 A1 | 11/2020 |

OTHER PUBLICATIONS

Zhou et al., "Image Restoration for Under-Display Camera", arXiv:2003.04857v1, Mar. 2020, 17 pages.

Bilcu et al., "Constrained Unsharp Masking for Image Enhancement", ICISP 2008, LNCS 5099, Springer-Verlag Berlin Heidelberg, 2008, 10 pages.

Romano et al., "RAISR: Rapid and Accurate Image Super Resolution", IEEE Transactions on Computational Imaging, vol. 3, No. 1, Jan. 2017, 31 pages.

* cited by examiner

INPUT IMAGE

EDGE MAP

DARK HALO CONTROL MASK

BRIGHT HALO CONTROL MASK

640 — BRIGHT HALO MASK WITH NO TEXT SEGMENTATION

650 — BRIGHT HALO MASK WITH TEXT SEGMENTATION

642 — SHARPENED IMAGE BASED ON HALO MASK WITH NO TEXT SEGMENTATION

652 — SHARPENED IMAGE BASED ON HALO MASK WITH TEXT SEGMENTATION

IMAGE SHARPENING

TECHNICAL FIELD

This disclosure relates generally to image processing. More specifically, this disclosure relates to image sharpening.

BACKGROUND

An image that is captured by a camera can include visual imperfections, such as blurriness, which reduce the visual quality of the image. A captured image could be blurry due to imperfect focus, camera motion, motion of an object, or in-camera sensor characteristics. Often times, images are post-processed to remove blur and thereby improve their visual quality. Image sharpening is a common technique to remove blur from an image. However, sharpening an image can produce a halo effect around one or more portions of a sharpened image. The halo effect itself can reduce the visual quality of the image that the sharpening process attempts to resolve.

SUMMARY

This disclosure provides systems and methods for image sharpening.

In a first embodiment, a method for image sharpening includes obtaining, using at least one sensor of an electronic device, an image that includes visual content. The method also includes generating an edge map that indicates edges of the visual content within the image. The method further includes applying a high-pass signal and an adaptive gain based on the edge map to sharpen the image. The method also includes generating a bright halo mask and a dark halo mask based on the edge map, where the bright halo mask indicates an upper sharpening limit and the dark halo mask indicates a lower sharpening limit. In addition, the method includes modifying a level of sharpening at one or more of the edges within the sharpened image to provide halo artifact reduction based on the bright halo mask and the dark halo mask.

In a second embodiment, a method for image sharpening includes obtaining an image of a scene using at least one sensor of an electronic device. The method also includes generating multiple intermediate sharpened images using the obtained image. The method further includes combining portions of the multiple intermediate sharpened images and the obtained image to generate a sharpened image of the scene.

In a third embodiment, a method for image processing includes obtaining multiple image frames of a scene using at least one under-display camera (UDC) of an electronic device. The multiple image frames include a first image frame and a second image frame that are captured using different exposures. The method also includes combining the first image frame and the second image frame to generate a blended image of the scene and a map. The map is based on at least one of the multiple image frames. The method further includes identifying a correction signal based on a comparison of the blended image and an output of a point spread function inversion (PSFI) process for increasing sharpness and removing artifacts. The method also includes modifying the correction signal based on the map. In addition, the method includes generating an image of the scene based on the modified correction signal and the blended image of the scene.

In a fourth embodiment, an electronic device includes a display and at least one image sensor positioned under the display. The electronic device also includes at least one processor operatively connected to the display and the at least one image sensor. The at least one processor is configured to obtain multiple image frames of a scene using the at least one image sensor. The multiple image frames include a first image frame and a second image frame that are captured using different exposures. The at least one processor is also configured to combine the first image frame and the second image frame to generate a blended image of the scene and a map. The map is based on at least one of the multiple image frames. The at least one processor is further configured to identify a correction signal based on a comparison of the blended image and an output of a PSFI process for increasing sharpness and removing artifacts. The at least one processor is also configured to modify the correction signal based on the map. In addition, the at least one processor is configured to generate an image of the scene based on the modified correction signal and the blended image of the scene.

In a fifth embodiment, a method for image processing includes obtaining multiple image frames of a scene using at least one UDC of an electronic device. The multiple image frames include a first image frame and a second image frame that are captured using different exposures. The method also includes combining the first image frame and the second image frame to generate a blended image of the scene. The method further includes identifying a correction signal based on a comparison of the blended image and an output of a PSFI process for increasing sharpness and removing artifacts. In addition, the method includes modifying the blended image based on the correction signal to generate an image of the scene.

In a sixth embodiment, an electronic device includes a display and at least one image sensor positioned under the display. The electronic device also includes at least one processor operatively connected to the display and the at least one image sensor. The at least one processor is configured to obtain multiple image frames of a scene using the at least one image sensor. The multiple image frames include a first image frame and a second image frame that are captured using different exposures. The at least one processor is also configured to combine the first image frame and the second image frame to generate a blended image of the scene. The at least one processor is further configured to identify a correction signal based on a comparison of the blended image and an output of a PSFI process for increasing sharpness and removing artifacts. In addition, the at least one processor is configured to modify the blended image based on the correction signal to generate an image of the scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" in accordance with this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
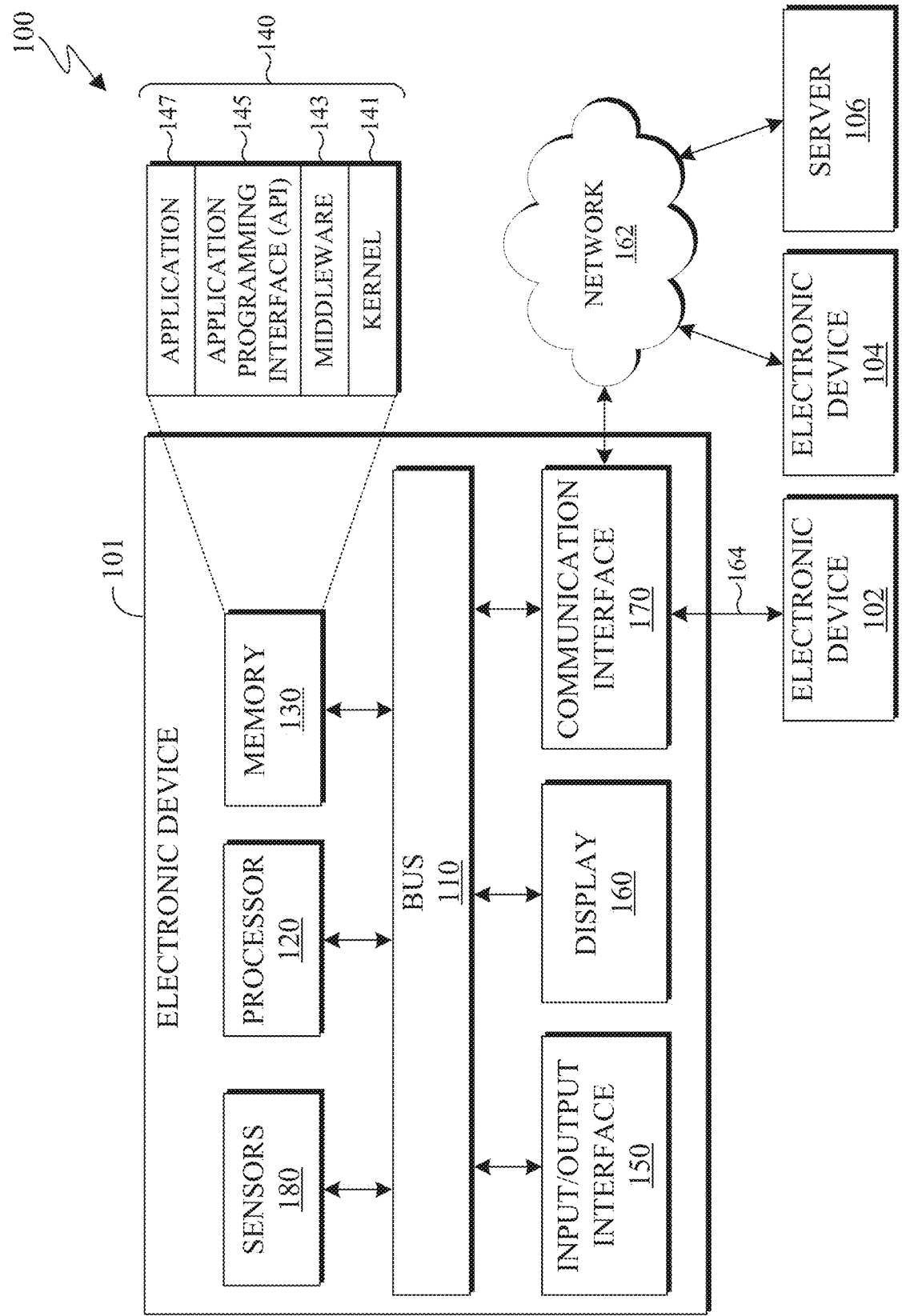
FIG. 1 illustrates an example network configuration including an electronic device in accordance with this disclosure.

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

As noted above, an image that is captured by a camera can include visual imperfections, such as blurriness, which reduce the visual quality of the image. A captured image could be blurry due to imperfect focus, camera motion, motion of an object, or in-camera sensor characteristics. One example of in-camera sensor characteristics that can affect blurriness is the presence of an image sensor located behind a display (also known as an under-display camera). Often times, images are post-processed to remove blur and thereby improve their visual quality. Image sharpening is a process that reduces the blurriness or softness of an image by enhancing and further defining the details within the image. For example, sharpening an image can make text within an image easier to read (since the lines of each letter are further defined), the texture of an object within the image more noticeable, or individual faces in a crowd more distinct. Sharpening enhances and further defines the details within an image by increasing the contrast along edges within the image. An edge that has more contrast appears to be better defined, which results in a sharper image. For instance, when contrast is added along an edge, one side of the edge can be darkened while the other side of the edge can be lightened.

Although edges of a resulting image are further defined due to increased contrast, a sharpened image may include defects due to the sharpening process, such as an increase of noise and artifacts like "halos" around the edges. Noise represents random variations of brightness or changes in color within an image. Due to the increase of contrast, the visibility of noise within the original image can be amplified, decreasing the visual quality of the image. A halo is often a line of a brighter or darker color that follows an edge in an image due to the increased contrast along the edge. Halos are prominent along high contrast edges of a sharpened image, such as along the edge of a tall building and the sky. A halo in an image can be characterized as a bright halo or a dark halo. For a given edge within an image, a bright halo appears on the brighter side of the edge, and the dark halo appears on the darker side of the edge. For example, a bright halo may represent a line of pixels that follow an edge, are brighter than neighboring pixels, and occur along the brighter side of an edge. Similarly, a dark halo may represent a line of pixels that follow an edge, are darker than neighboring pixels, and occur along the darker side of an edge.

Embodiments of this disclosure describe various image processing techniques for image sharpening while reducing the appearance of halos around certain edges within images. For example, after an image of a visual scene captured by a camera or a frame of a video is obtained, an edge map of the captured image is generated. The edge map indicates edges of visual content within the image. Based on the generated edge map, a bright halo mask and a dark halo mask can be generated. The bright halo mask corresponds to the brighter side of each edge and indicates an upper sharpening limit. The dark halo mask corresponds to the darker side of each edge and indicates a lower sharpening limit. Limiting the sharpening at the areas indicated by the bright halo mask and the dark halo mask reduces or eliminates the appearance of halos within a sharpened image. By altering the level of sharpening at certain portions of the image, the overall image is sharpened while the appearance of halos within the image and noise within the image are reduced.

Embodiments of this disclosure also describe various image processing techniques for an adaptive halo control. For example, depending on the number of edges within a certain region of an image, embodiments of this disclosure can enable halos to appear in that region instead of reducing the appearance of the halos. Additionally, when text is identified within a certain region of an image, embodiments of this disclosure can reduce halos around the text but allow halos to appear within lines that form individual letters of the text itself.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

In accordance with this disclosure, an electronic device 101 is included in the network configuration 100. The electronic device 101 can include at least one of a bus 110, a processor 120, a memory 130, an input/output (I/O) interface 150, a display 160, a communication interface 170 and sensors 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera or other image sensor during a capture event. Among other things, the processor 120 can process the image data (as discussed in more detail below) to generate one or more sharpened images, such as by using bright and dark halo masks or other techniques disclosed in this patent document.

The memory 130 can include a volatile and/or non-volatile memory. For example, the memory 130 can store commands or data related to at least one other component of the electronic device 101. In accordance with this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other image sensors for capturing images of scenes or frames of a video. In some embodiments, at least one image sensor may represent an under-display camera (UDC) that is positioned under the display 160 of the electronic device 101 such that the image sensor(s) and any accompanying lenses are not visible via an external inspection of the electronic device 101 since the image sensor is hidden behind the display 160. In other embodiments, the image sensor(s) can be visible, such as through a punch hole or notch within the housing of the electronic device 101, in order for the image sensor(s) to capture an image of a scene. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 can process image data (as discussed in more detail below) to generate one or more sharpened images, such as by using bright and dark halo masks or other techniques disclosed in this patent document.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
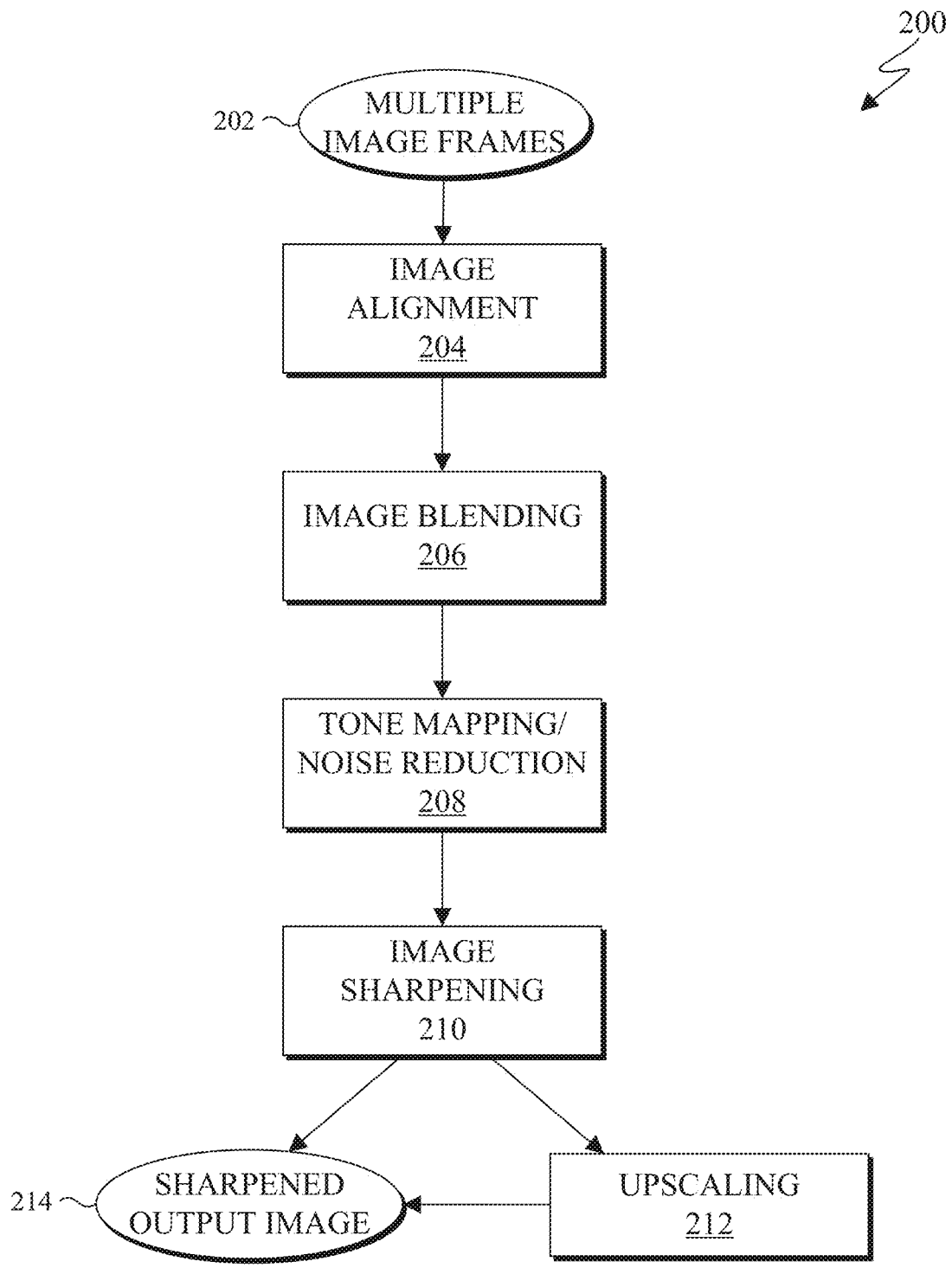
FIG. 2 illustrates an example process for multi-frame fusion in accordance with this disclosure.

FIG. 2 illustrates an example process 200 for multi-frame fusion in accordance with this disclosure. For ease of explanation, the process 200 shown in FIG. 2 is described as being performed using the electronic device 101 shown in FIG. 1. However, the process 200 shown in FIG. 2 could be used with any other suitable electronic device and in any suitable system, such as when performed by the server 106.

As shown in FIG. 2, the process 200 is generally used to capture or otherwise obtain one or more image frames 202 of a scene and to process the one or more image frames 202 in order to generate a sharpened output image 214. Among other things, the sharpened output image 214 may be produced by combining or fusing image data contained in the image frame(s) 202. Depending on the implementation, the process 200 may receive one input frame 202 or multiple input frames 202.

In some instances, during a capture operation, the processor 120 can control one or more cameras or other image sensors 180 of the electronic device 101 so that the image frames 202 are captured rapidly, such as in a burst mode. Alternatively, if the electronic device 101 includes multiple cameras or other image sensors 180, the image frames 202 may be captured simultaneously or in an overlapping manner. A capture request that triggers the capture of the image frames 202 represents any suitable command or input indicating a need or desire to capture an image of a scene using the electronic device 101. For example, the capture request could be initiated in response to a user's pressing of a "soft" button presented on the display 160 or the user's pressing of a "hard" button.

The image frames 202 are provided to an image alignment operation 204, which generally operates to align the image frames 202 and produce aligned image frames. For example, the image alignment operation 204 may modify one or more of the image frames so that particular features align with corresponding features in another image frame. Alignment may be needed to compensate for misalignment caused by the electronic device 101 moving or rotating in between image captures, which causes objects in the image frames 202 to move or rotate slightly (as is common with handheld devices). The image frames 202 can be aligned both geometrically and photometrically. Various techniques now known or later developed may be used here to align the multiple image frames.

The aligned image frames 202 are provided to an image blending operation 206, which blends or otherwise combines pixels from the multiple aligned image frames in order to produce a blended image of the scene. The blended image generally represents a fusion of the image frames, where each pixel in the blended image is extracted from either a reference or non-reference image frame or is a combination of pixels from both the reference and the non-reference image frames. Various techniques now known or later developed may be used here to blend the image frames. The blended image is provided to a tone mapping and noise reduction operation 208. The tone mapping and noise reduction operation 208 can perform any suitable tone mapping, such as mapping one set of colors within the blended image to another set of colors in order to approximate the appearance of a high-dynamic-range (HDR) image. The tone mapping and noise reduction operation 208 can also perform any suitable noise reduction in order to remove noise from the blended image.

The tone-mapped and noise-reduced image is provided to an image sharpening operation 210. The image sharpening operation 210 can perform any suitable sharpening to increase the details within the image. In some embodiments, during the image sharpening operation 210, the image can be sharpened using a high-pass signal. Also, in some embodiments, an edge map of the image can be generated, and an adaptive gain can be applied to the image based on the edge map. Further, in some embodiments, a bright halo mask and a dark halo mask can be generated based on the edge map and the high-pass signal, and the sharpening can be reduced or clipped at certain areas of the image according to a high limit set by the bright halo mask and a low limit set by the dark halo mask in order to reduce the appearance of halos within the sharpened image. More details regarding the image sharpening operation 210 are described below.

The sharpened image can be provided to an upscaling operation 212 or output as the sharpened output image 214. The upscaling operation 212 can be used to increase the resolution of the sharpened image. For example, the sharpened image can be provided to the upscaling operation 212 in order to generate a super-resolution (SR) image.

The various operations of the process 200 shown in FIG. 2 can be implemented in any suitable manner. For example, each of the operations of the process 200 can be implemented or supported using one or more software applications or other software instructions that are executed by at least one processor 120 of the electronic device 101. In other embodiments, at least some of the operations of the process 200 can be implemented or supported using dedicated hardware components. In general, the operations of the process 200 can be performed using any suitable hardware or any suitable combination of hardware and software/firmware instructions.

Although FIG. 2 illustrates one example of a process 200 for multi-frame fusion, various changes may be made to FIG. 2. For example, the electronic device 101 may perform any other desired functions as part of the process 200 or as part of a large image processing algorithm. As a particular example, the image frames 202 may undergo other suitable pre-processing and post-processing operations. Also, as noted above, a single image frame 202 may be received and processed here, in which case the image alignment operation 204 and the image blending operation 206 could be omitted or skipped.

Figure 3A:
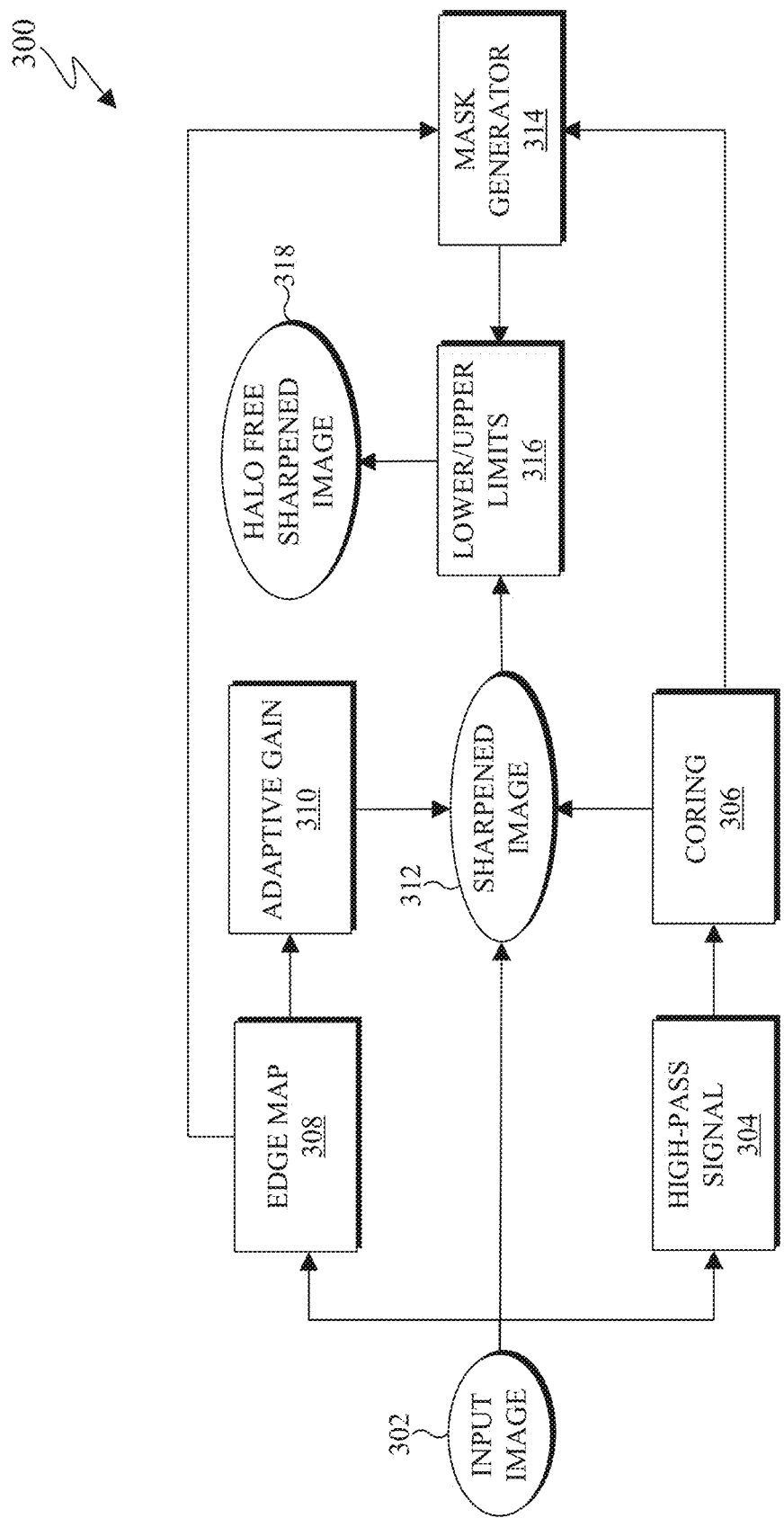
FIG. 3A illustrates an example process for performing image sharpening in the process of FIG. 2 in accordance with this disclosure.
Figure 3B:
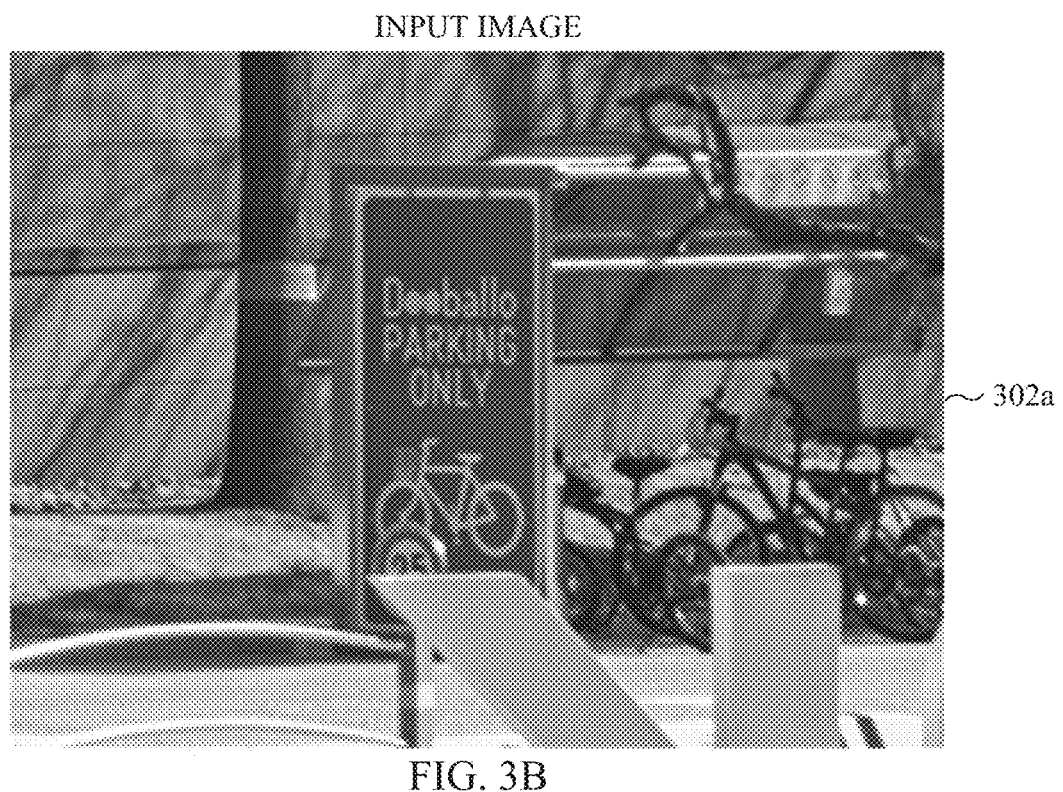
FIG. 3B illustrates an example input image in accordance with this disclosure.
Figure 3C:
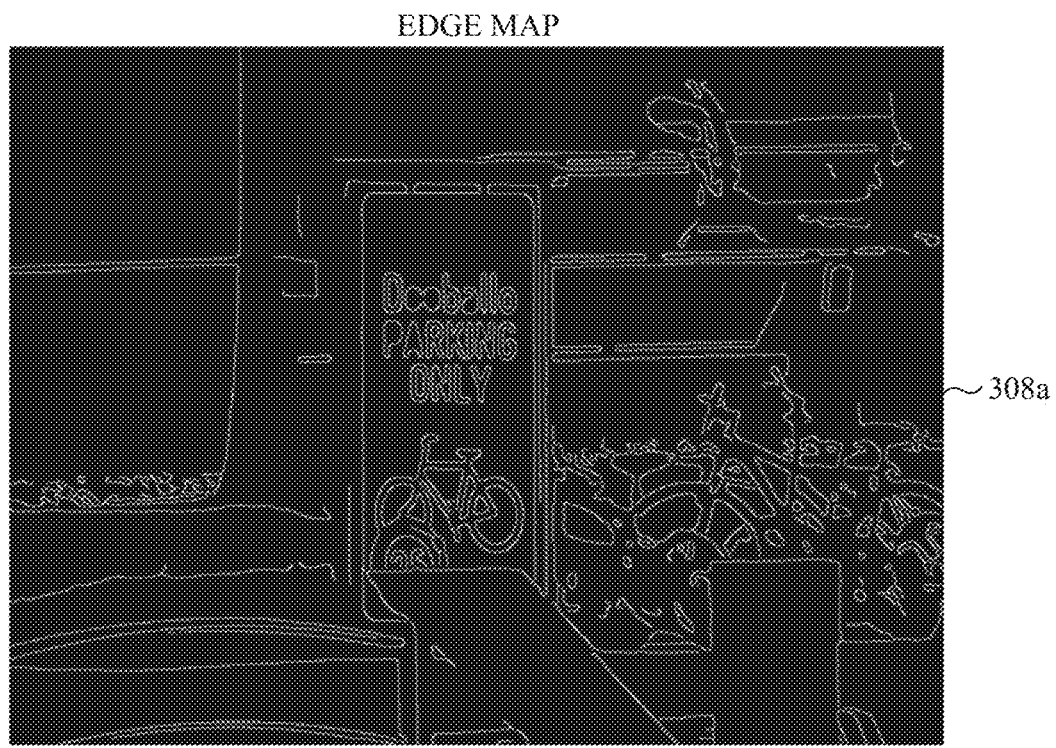
FIG. 3C illustrates an example edge map of the input image of FIG. 3B in accordance with this disclosure.
Figure 3D:
FIG. 3D illustrates an example dark halo mask of the input image of FIG. 3B in accordance with this disclosure.
Figure 3E:
FIG. 3E illustrates an example bright halo mask of the input image of FIG. 3B in accordance with this disclosure.

FIG. 3A illustrates an example process 300 for performing image sharpening in the process of FIG. 2 in accordance with this disclosure. In particular, the process 300 shown in FIG. 3A may be performed as part or all of the image sharpening operation 210 in the process 200 shown in FIG. 2. FIG. 3B illustrates an example input image 302a in accordance with this disclosure. FIG. 3C illustrates an example edge map 308a generated from the input image 302a of FIG. 3B in accordance with this disclosure. FIG. 3D illustrates an example dark halo mask 314a generated from the input image 302a of FIG. 3B in accordance with this disclosure. FIG. 3E illustrates an example bright halo mask 314b generated from the input image 302a of FIG. 3B in accordance with this disclosure. For ease of explanation, the process 300 shown in FIG. 3A is described as being performed using the electronic device 101 shown in FIG. 1. However, the process 300 shown in FIG. 3A could be used with any other suitable electronic device and in any suitable system, such as when performed by the server 106.

As shown in FIG. 3A, the process 300 is generally used to adaptively sharpen an input image 302 without introducing noise and halo artifacts into the image 302. In this example, a single input image 302 is captured and processed, although more than one image may also be used. The input image 302 may be obtained in any suitable manner. For example, the input image 302 can be captured by at least one camera or other image sensor 180 in FIG. 1. As another example, the input image 302 can be obtained from an information repository, such as the memory 130 of FIG. 1. As yet another example, the input image 302 can be based on multiple image frames that are combined into a single input image based on the multiple-frame fusion technique of the process 200 of FIG. 2. In this example, the input image 302 could be the same as or similar to a single image frame 202 or the tone-mapped and noise-reduced image from the tone mapping and noise reduction operation 208 of FIG. 2. The input image 302a shown in FIG. 3B illustrates one specific example of an input image 302.

The input image 302 can be provided to a high-pass signal operation 304. The high-pass signal operation 304 performs an image sharpening operation that makes the input image 302 appear sharper by emphasizing fine details in the image 302. In some embodiments, the high-pass signal operation 304 uses a high-pass signal to identify edges within the input image 302. Once the high-pass signal identifies the edges within the image, the contrast of the edges can be increased. In some embodiments, the high-pass signal operation 304 uses a low-pass filter to generate a low-pass signal of the input image 302, where the low-pass signal can be combined with the input image 302 to generate the high-pass signal. The high-pass signal operation 304 then combines the high-pass signal with the input image 302 to generate sharpened edges within the input image 302. Combining the high-pass signal with the input image 302 causes the input image 302 to appear sharper (less blurry) since widths of edges in the input image 302 are reduced. In some cases, the high-pass signal can be defined as:

$$imgD = imgY - \text{Gaussian}(imgY) \quad (1)$$

Here, imgY is the input luma channel, and Gaussian( ) is a low-pass Gaussian filter. Using a high-pass signal for sharpening an image can cause small details to be greatly exaggerated, which can create a grainy or noisy appearance to the image.

Since the high-pass signal operation 304 can increase noise within the image, a coring operation 306 can be performed to reduce the noise. For example, the coring operation 306 may apply any suitable noise reduction to the high-pass signal before the high-pass signal is combined with the input image 302. In some embodiments, the coring operation 306 is similar to a thresholding function that clips small values of the high-pass signal. For example, the coring operation 306 can use one or more thresholds to smooth the image. In some embodiments, the coring operation 306 can be defined as:

$$coringSlope = 256 * \frac{coring\ (2)}{(coring\ (2) - coring\ (1))} \quad (2)$$

$$coringGain = \quad (3)$$
$$\min(\max(abs(imgD) - coring\ (1), 0) = coringSlope, 256)$$

$$coringGain = filter2\left(\frac{ones\ (5, 5)}{25}, coringGain\right) \quad (4)$$

$$imgD = imgD * \frac{coringGain}{256} \quad (5)$$

Here, coring(1) and coring(2) are thresholds used to determine where thresholding is applied for clipping portions of the high-pass signal in order to reduce increased noise that was introduced by the high-pass signal operation 304.

The input image 302 can also be provided to an edge map operation 308. The edge map operation 308 can perform any suitable edge map generation process for generating an edge map. For example, edge map operation 308 can use a canny edge map technique to generate the edge map. The edge map indicates the edges within the input image 302. In some embodiments, the edge map operation 308 identifies the edges within the input image 302 due to a sudden change in brightness. The area in which image brightness changes can be organized into a set of lines that are referred to as edges. FIG. 3C illustrates an example edge map 308a that may be generated by the edge map operation 308 for the input image 302a. White lines shown in the edge map 308a indicate edges where the brightness of the input image 302a changes abruptly. The edge map 308a does not indicate which side of a line is brighter or darker. Rather, the edge map 308a simply shows the locations of edges within the input image 302a.

In some embodiments, the edge map operation 308 also identifies edge strength, such as strong or thin edges. In some cases, edge strength can be based on gradient magnitude. For example, to identify an edge strength, the edge map operation 308 can apply one or more thresholds to the input image 302 when generating the edge map. The lower the threshold, the more edges that can be identified from the input image 302. As a result, a lower threshold can identify edges that correspond to fine details within the input image 302, and a higher threshold can result in less edges being identified from the input image 302 (such as when a higher threshold can identify edges that correspond to more significant changes in brightness).

The edge map is provided to an adaptive gain operation 310. The adaptive gain operation 310 applies sharpening gain to certain edges of the edge map. For example, the adaptive gain operation 310 may apply the sharpening gain along strong edges of the edge map to reduce edge spreading, which thins the strong edge. A thinner edge corresponds to a sharper image since the transition between two areas occurs over a smaller distance in the image. In some embodiments, the adaptive gain operation 310 applies a sharpening gain of a first level at the center of an edge and reduces the level of gain as the distance from the edge center increases. Also, in some embodiments, the adaptive gain operation 310 first applies a sharpening gain to the entire edge map and then applies additional sharpening gain to the strong edges as indicated by the edge map. In addition, in some embodiments, the amount of sharpening gain applied to each edge is based on the strength of the edge. For example, the stronger the edge, the more gain that is applied to that edge.

The process 300 combines the input image 302 with the outputs of the coring operation 306 and the adaptive gain operation 310 to generate a sharpened image 312. The sharpened image 312 is a sharpened version of the input image 302. Due to the sharpening, artifacts (such as one or more halos) could form in the sharpened image 312. A halo could appear on each side of an identified edge. For example, for a given edge, the brighter side of the edge can include a bright halo, while the darker side of the edge could include a dark halo. The edge map and the output of the coring operation 306 are therefore provided to a mask generator 314. The mask generator 314 generates a bright halo mask and a dark halo mask, where the bright and dark halo masks represent two single-sided masks for bright and dark halo suppression, respectively. The bright halo mask indicates the brighter side of each edge included in the edge map, and the dark halo mask indicates the darker side of each edge included in the edge map.

FIG. 3D illustrates an example dark halo mask 314a that corresponds to the input image 302a, and FIG. 3E illustrates an example bright halo mask 314b that corresponds to the input image 302a. Lines of the dark halo mask 314a as shown in FIG. 3D correspond to the darker sides of edges of the edge map 308a, while lines of the bright halo mask 314b as shown in FIG. 3E correspond to brighter sides of edges of the edge map 308a. To generate the bright halo mask and the dark halo mask, the mask generator 314 can identify the brighter and darker sides of each edge of the edge map, and the mask generator 314 can compare the brightness of the input image 302 at each side of an edge of the edge map. The brighter sides of the edges of the edge map correspond to the lines of the bright halo mask, and the darker sides of the edges of the edge map correspond to the lines of the dark halo mask.

In some embodiments, to generate the bright halo mask and the dark halo mask, the mask generator 314 identifies the brighter side and the darker side of an edge of the edge map using the high-pass signal. Since the edge indicates a transition from bright to dark or dark to bright, the high-pass signal can be used to identify the darker side and the brighter side of the edge. For example, the high-pass signal can be positive (greater than zero) on the brighter side of an edge due to a transition from bright to dark, and the high-pass signal can be negative (less than zero) on the darker side of an edge due to a transition from dark to bright.

The bright and dark halo masks are used to create adaptive lower and upper limits in the sharpening process to reduce the appearance of halos in the sharpened image. For example, the bright halo mask indicates where a bright halo will most likely appear in the sharpened image 312, so the bright halo mask is used to indicate an upper sharpening limit. Similarly, the dark halo mask indicates where a dark halo will most likely appear in the sharpened image 312, so the dark halo mask is used to indicate a lower sharpening limit. Effectively, the bright halo mask and the dark halo mask indicate how much sharpening can be performed without creating a halo (or at least reducing or minimizing the creation of any halo). For example, the bright halo mask and the dark halo mask indicate respective levels of sharpening that, if exceeded, could cause a corresponding bright or dark halo artifact to appear.

In some embodiments, to generate the bright halo mask, a sliding window of a predetermined size moves across the input image 302 to identify a maximum brightness value in that area. For example, if the window is 3 pixels by 3 pixels, the sliding window identifies the largest luma channel value of the nine pixels within the window. The largest luma channel value is the upper limit for the bright halo mask. Similarly, to generate the dark halo mask, a sliding window of a predetermined size moves across the input image 302 to identify a minimum brightness value in that area. For example, if the window is 3 pixels by 3 pixels, the sliding window identifies the smallest luma channel value of the nine pixels within the window. The smallest luma channel value is the lower limit for the dark halo mask. To avoid a halo, sharpening may not go above the value indicated in the bright halo mask and lower than the value indicated in the dark halo mask. In some cases, tighter lower/upper limits are selected for the bright and dark halo masks if the masks have higher values, while looser lower/upper limits are selected if the masks have lower values. Note that other window sizes can be used here, such as a window of 4 pixels by 4 pixels. Also note that the window can be asymmetrical.

A lower/upper limits operation 316 modifies a level of sharpening at one or more of the edges within the sharpened image 312 for reducing the appearance of halo artifacts (also referred to as "halo control" and "halo suppression") according to the bright halo mask and the dark halo mask. The bright halo mask and the dark halo mask indicate the lower and upper limits for halo control that is used by the lower/upper limits operation 316. For example, the lower/upper limits operation 316 can modify the sharpening as indicated by the bright halo mask and the dark halo mask in order to prevent excess sharpening while still thinning the edges. The lower/upper limits operation 316 uses the bright halo mask and the dark halo mask to modify an amount of sharpening by creating thinner edges without over-sharpening the edges.

In some embodiments, the lower/upper limits operation 316 modifies a level of sharpening based on the bright halo mask, the dark halo mask, and a type of edge for sharpening purposes. The edge type can be determined based on the edge map that was generated by the edge map operation 308. The edge type can be identified as a strong edge or a fine edge based on the threshold level that is used when generating the edge map. In some embodiments, the process 300 can also identify that edges within the input image 302 correspond to text (such as letters or words), and the process 300 can utilize text segmentation to identify text within the input image 302.

As a particular example, based on the type of edge, the mask generator 314 can modify the bright halo mask and the dark halo mask. For a strong edge, the bright halo mask and the dark halo mask can be used for modifying an amount of sharpening that reduces halos. For fine details within the image, the bright halo mask and the dark halo mask may not be used. As such, the process 300 does not use the bright halo mask and the dark halo mask to limit or reduce sharpening for removing halos at locations of the edge map that correspond to fine edges. For areas of an image that include text (such as words or letters), the bright halo mask and the dark halo mask can be used to reduce halos around letters of the text, but the bright halo mask and the dark halo mask may not be used to limit or reduce sharpening for removing halos at locations within lines that form the actual text.

After the lower/upper limits operation 316 modifies a level of sharpening at one or more of the edges within the sharpened image 312, the process 300 produces a halo-free sharpened image 318. The halo-free sharpened image 318 generally represents a sharpened version of the input image 302 without halos. Additional image processing operations can occur thereafter. For example, an upscaling operation, such as the upscaling operation 212 of FIG. 2, can be performed to the halo-free sharpened image 318. Ideally, the halo-free sharpened image 318 has improved image details due to sharpening with little or no halo artifacts and noise.

Although FIG. 3A illustrates one example of a process 300 for performing image sharpening in the process 200 of FIG. 2, various changes may be made to FIG. 3A. For example, while shown as a specific sequence of operations, various operations shown in FIG. 3A could overlap, occur in parallel, occur in a different order, or occur any number of times. Also, the specific operations shown in FIG. 3A are examples only, and other techniques could be used to perform each of the operations shown in FIG. 3A. Although FIGS. 3B, 3C, 3D, and 3E illustrate various images and maps, various changes may be made to FIGS. 3B, 3C, 3D, and 3E. For example, FIGS. 3B, 3C, 3D, and 3E are merely meant to illustrate examples of the types of results that could be obtained using the approaches described in this disclosure. Obviously, images of scenes can vary widely, and the results obtained using the approaches described in this patent document can also vary widely depending on the circumstances. Also, the maps shown in FIGS. 3C, 3D, and 3E may vary even for the same image as shown in FIG. 3B.

Figure 4:
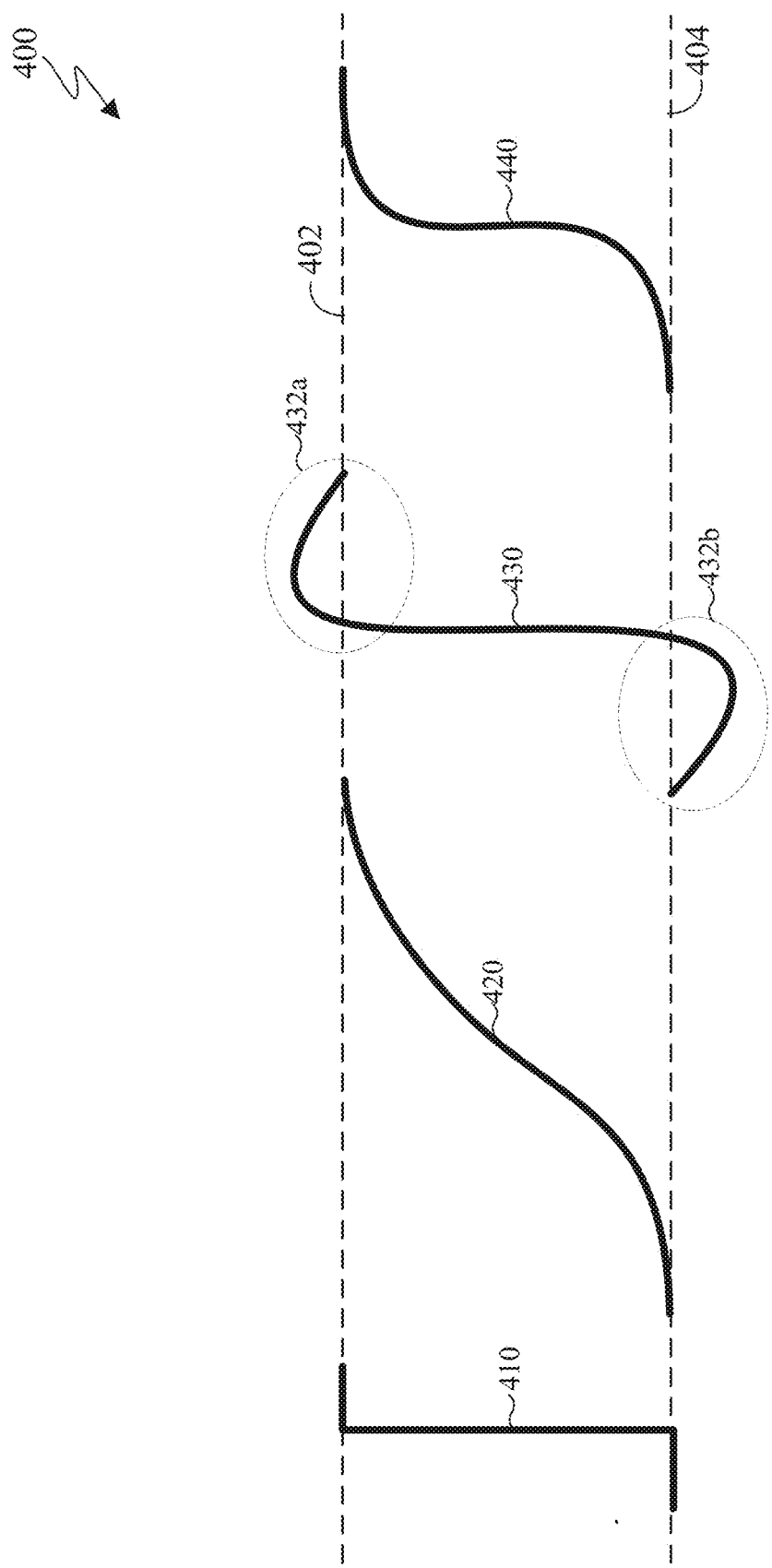
FIGS. 4, 5A, and 5B illustrate examples of applying sharpening with halo control in accordance with this disclosure.
Figure 5A:
Figure 5A:
Figure 5B:
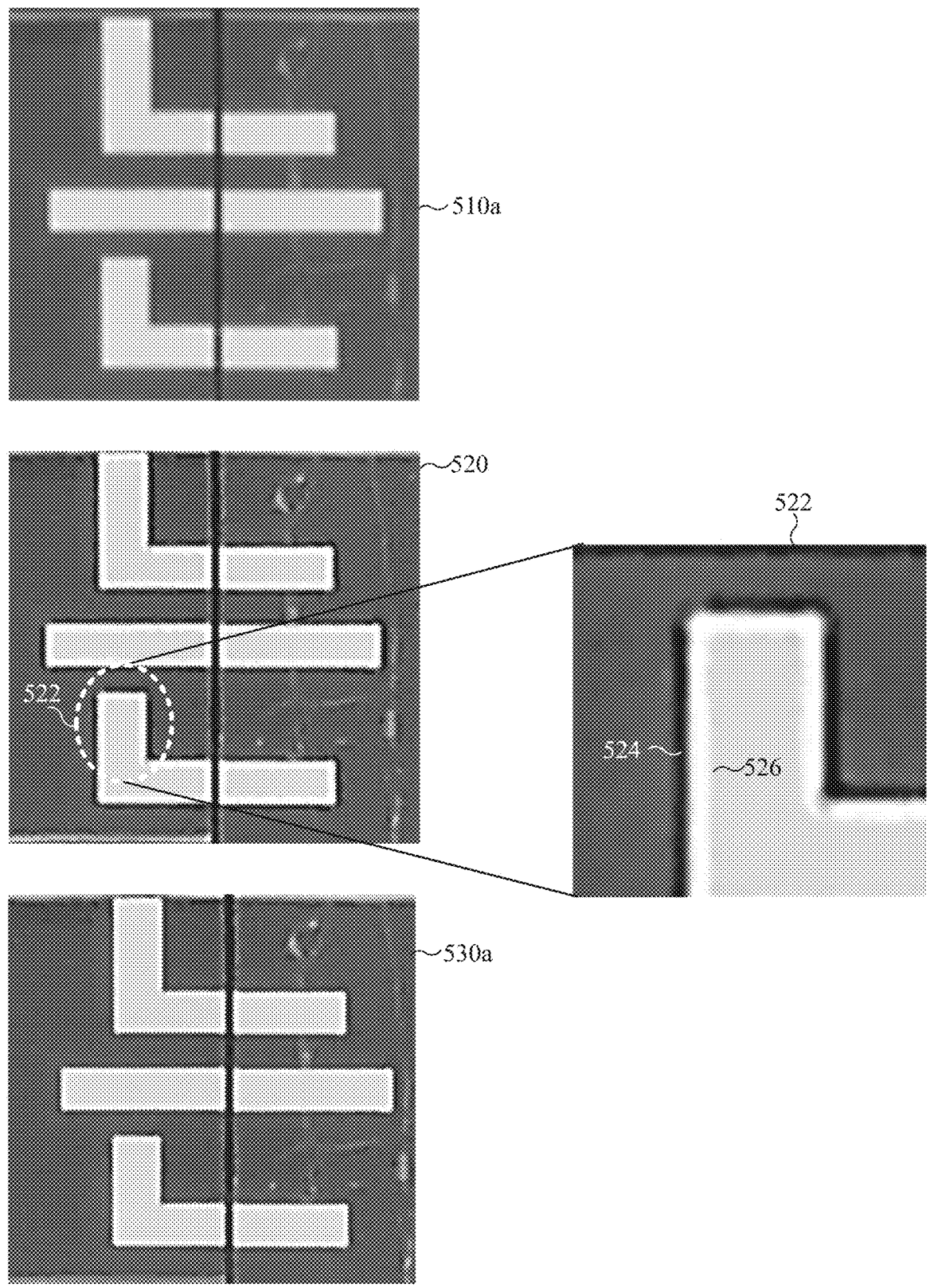

FIGS. 4, 5A, and 5B illustrate examples of applying sharpening with halo control in accordance with this disclosure. For ease of explanation, the application of the sharpening here is described as being performed using the electronic device 101 of FIG. 1. However, any other suitable electronic device in any suitable system may be used, such as when applied by the server 106.

As shown in FIG. 4, a diagram 400 illustrates the process 300 of FIG. 3A for image sharpening with halo control. The diagram 400 illustrates four different edges, which are illustrated as curves here. The curves indicate how much the corresponding edges spread. There is a correlation between the sharpness of an image and the number of pixels that are used for transitioning between brighter and darker areas. For example, a curve 410 represents an idealized edge since there is a sudden transition between bright and dark of the edge. Stated differently, the curve 410 represents a sharpened edge due to the abrupt transition between brightness values. In contrast, a curve 420 represents a blurry edge since the curve 420 is spread out more compared to the curve 410, indicating a blurry edge since the distinction between bright and dark values is spread out over a larger distance. As shown here, the curve 420 indicates that a specified edge is spread out over a large distance (and subsequently a large number of pixels) compared to the curve 410, which uses less distance to transition between the same values. As described above, an edge can be blurred due to imperfect focus, camera motion, in-camera optical and sensor characteristics, and the like. A sharpening process, such as the process 300 of FIG. 3A, can sharpen an edge so that the edge transitions between bright and darker values over a shorter distance. An example of this is illustrated by a sharpened curve 430.

In this example, an upper boundary 402 and a lower boundary 404 indicate boundaries that (should a curve cross during a sharpening operation) one or more halos could appear in the sharpened image along an edge. In particular, the upper boundary 402 corresponds to the local maximum and the lower boundary 404 corresponds to the local minimum that were identified when generating the bright and dark halo masks. For example, if a curve crosses the upper boundary 402 due to sharpening, a bright halo could appear along the brighter side of the edge that is represented by the curve. Similarly, if a curve crosses the lower boundary 404 due to sharpening, a dark halo could appear along the darker side of the edge that is represented by the curve.

In this example, the curve 420 could correspond to an edge of the input image 302 of FIG. 3A, and the sharpened curve 430 could represent a sharpened edge of the sharpened image 312 of FIG. 3A. In some embodiments, the sharpened curve 430 is the result of applying a high-pass signal to the curve 420. As illustrated, a portion 432a of the sharpened curve 430 crosses the upper boundary 402 due to sharpening the image. Similarly, a portion 432b of the sharpened curve 430 crosses the lower boundary 404 due to sharpening the image. The portion 432a can correspond to a bright halo, and the portion 432b can correspond to a dark halo.

The lower/upper limits operation 316 of FIG. 3A can use the bright halo mask to identify the portion 432a, and the lower/upper limits operation 316 can modify the sharpening to remove the portion 432a in order to prevent a bright halo from appearing in the sharpened image by limiting the sharpening to the upper boundary 402. The lower/upper limits operation 316 of FIG. 3A can also use the dark halo mask to identify the portion 432b, and the lower/upper limits operation 316 can modify the sharpening to remove the portion 432b in order to prevent a dark halo from appearing in the sharpened image by limiting the sharpening to the lower boundary 404. Limiting the sharpening within the upper boundary 402 and the lower boundary 404 results in an improved sharpened curve 440. The curve 440 represents a sharper edge of the halo-free sharpened image 318 without a halo artifact.

An example of sharpening the edges of an image is shown in FIGS. 5A and 5B. FIG. 5A illustrates an image 502 that is captured by an image sensor, such as the sensor 180 of FIG. 1. The image 502 includes edges that are blurry (such as edges that correspond to the curve 420 of FIG. 4). In contrast, the image 504 illustrates a sharpened version of the image 502 without halos. A portion 510a of the image 502 is enlarged in FIG. 5B. As shown in FIG. 5B, the portion 510a illustrates that the letters of the image 510a are blurry due to the gradual transition between bright and dark pixels. Similarly, a portion 530a of the image 504 is enlarged in FIG. 5B. As shown in FIG. 5B, the portion 530a illustrates that the letters of the image 510a are sharpened without halos. The portion 510a and the portion 530a correspond to the same content within the images 502 and 504, respectively.

When portions of a captured image, such as the image 502, are blurry, the process 300 of FIG. 3A can increase the sharpness in the image while reducing or eliminating bright and dark halos that are created due to the sharpening process. For example, an image segment 520 illustrates a sharpening process without halo reduction. As can be seen, the image segment 520 includes artifacts, namely a dark halo 524 on the darker side of the edge and a bright halo 526 on the brighter side of the edge as illustrated in the enlarged portion 522. Any of the edges of the image segment 520 can correspond to the curve 430 of FIG. 4 due to the presence of halos. Limiting the amount of sharpening based on the bright and dark halo masks (such that the sharpening cannot exceed the upper boundary 402 and the lower boundary 404 of FIG. 4) results in the sharpened image segment 530a as shown in FIG. 5B. Any of the edges of the image segment 530a can correspond to the curve 440 as shown in FIG. 4 due to the sharpening process without introducing halos. The sharpened image segment 530a is a final image segment of the image 504 using the process 300 of FIG. 3A.

Although FIGS. 4, 5A, and 5B illustrate examples of applying sharpening with halo control, various changes may be made to FIGS. 4, 5A, and 5B. For example, FIGS. 4, 5A, and 5B are merely meant to illustrate examples of the types of results that could be obtained using the approaches described in this disclosure. Obviously, images of scenes can vary widely, and the results obtained using the approaches described in this disclosure can also vary widely depending on the circumstances.

Figure 6A:
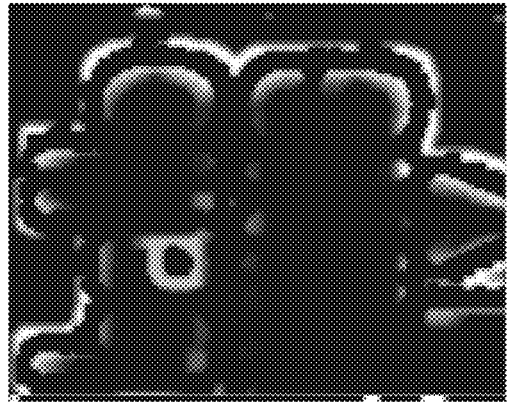
FIGS. 6A and 6B illustrate example modifications to bright and dark halo masks in accordance with this disclosure.
Figure 6A:
Figure 6A:
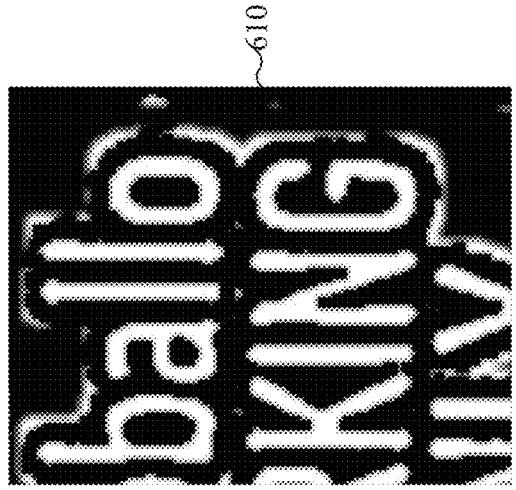
Figure 6A:
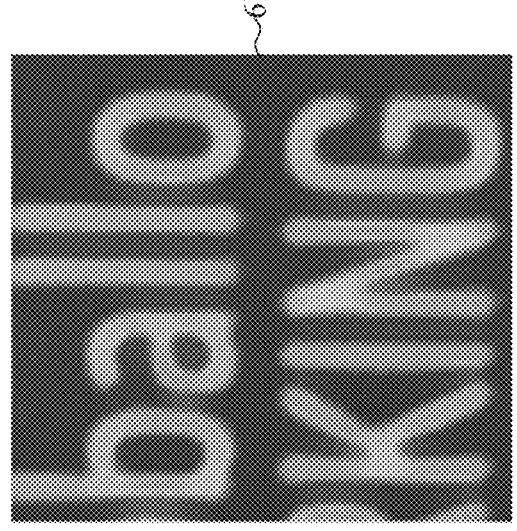
Figure 6B:
Figure 6B:
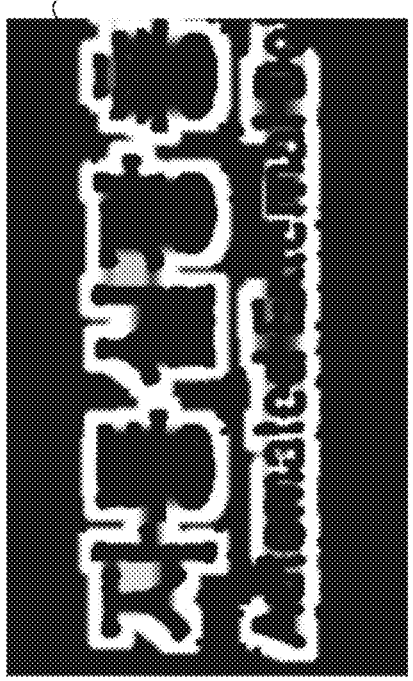
Figure 6B:
Figure 6B:
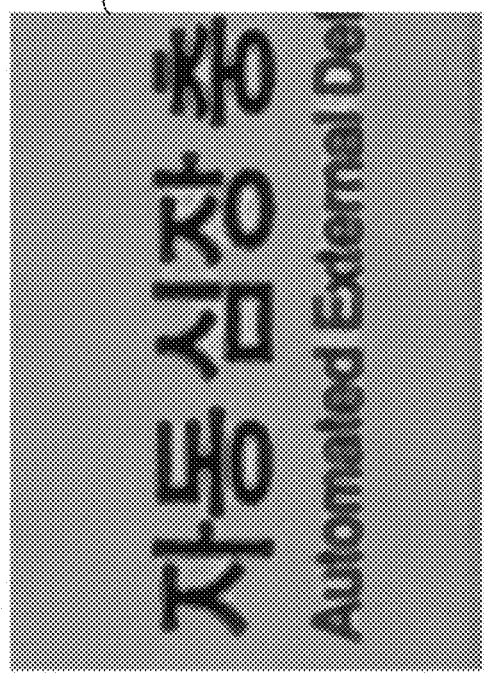

FIGS. 6A and 6B illustrates example modifications to bright and dark halo masks in accordance with this disclosure. More specifically, FIG. 6A illustrates modifications to a halo mask based on a density of edges within an input image for image sharpening, and FIG. 6B illustrates modifications to a halo mask based on identifying that an input image includes text for image sharpening. Thus, FIG. 6A describes modifications to a halo mask within the lines that form text itself, while FIG. 6B describes modifications to a halo mask for regions around text. For ease of explanation, the modifications to bright and dark halo masks are described as being implemented using the electronic device 101 of FIG. 1. However, any other suitable electronic device in any suitable system may be used, such as when performed by the server 106.

FIG. 6A illustrates the effect of modifying specific portions of one or more of the halo masks based on the density of the edges within a portion of an image. Edge density is based on the number of edges, as indicated by the edge map, within a certain distance or area. An edge sum filter can be used to quantify the number of edges within a given region of an image. For example, an edge sum filter can use a sliding window of size N by N, which traverses the edge map. The edge sum filter counts the number of pixels that correspond to edges within the sliding window in order to identify portions of the edge map that include an edge density larger than a threshold. An edge density that is lower than the threshold indicates a relatively low number of edges within the region. An edge density that is higher than the threshold indicates a relatively large number of edges within the region. In some embodiments, the threshold to determine whether a portion of an image includes a low number of edges or a high number of edges is predetermined. In other embodiments, the threshold can be based on the total number of edges within the image itself such that the threshold can change from image to image. A portion of an image with an edge density that is larger than the threshold can indicate that the portion of the image includes fine details and thin structures. Based on comparing the edge density of a portion of the image to a threshold, the electronic device 101 can identify areas of an image with fine details, thin structures, and areas within text itself.

If the edge density is larger than the threshold, halo control strength can be reduced. Reducing the halo control strength for one or both of the bright and dark halo masks at a region in the image enables halos to form within those identified regions of the image, since the bright halo mask and/or the dark halo mask no longer prevents halos from forming at that region. For example, an image 612 depicts a sharpened image generated using a bright halo mask 610. The bright halo mask 610 is a portion of the bright halo mask 314b as shown in FIG. 3D, and the image 612 is a portion of the input image 302a as shown in FIG. 3B. The bright halo mask 610 is used to reduce bright halos that would form within the text since the text is brighter than the background. As illustrated here, the image 612 appears blurry because the bright halo mask 610 reduces bright halos that would have formed within the text of the image 612. Therefore, reducing the control strength of the bright halo mask, as shown by a modified bright halo mask 620, enables bright halos to appear inside letters as shown in a modified image 622. The modified image 622 therefore appears sharper than the image 612 due to the presence of the bright halos. In this example, the image 612 includes text that is brighter than the background. However, the color scheme can be reversed such that the text is darker than the background (as shown in an image 642 of FIG. 6B). If the text is darker than the background, a dark halo mask may be modified to enhance the sharpness of an image in a similar manner as the bright halo mask.

FIG. 6B illustrates the effects of modifying specific portions of one or more of the halo masks that correspond to text. Since text will often have an edge density that is larger than the threshold, halos can appear around the text. In order to remove halos around the text, the electronic device 101 can identify text within the image. In some embodiments, the electronic device 101 uses a text segmentation process for identifying regions of the image that include text. When text is identified, the electronic device 101 can reduce the edge density around the text region such that halo control between the text remains active. For example, even if the portion of the image is identified as having an edge density that is larger than a threshold, the electronic device 101 can lower the identified edge density value to a value that is lower than the threshold in order to force the halo mask to remain active and limit halos in the regions around the text itself.

In this example, the image 642 is sharpened using a bright halo mask that is modified due to the region of the image having an edge density larger than a threshold. As can be seen in the image 642, artifacts such as white halos appear around the text due to the suppression of the bright halo mask. Therefore, when the electronic device 101 identifies that the region includes text, the edge density is suppressed for this region such that the bright halo mask is not modified, which enables the bright halo mask 630 to reduce halos as seen in an image 652. The image 652 does not include white halos around the text compared to the image 642 since the bright halo mask 650 is not modified due to the edge density. Again, in this example, the image 642 includes text that is darker than the background. However, the color scheme can be reversed such that the text is brighter than the background. If the text is brighter than the background, a dark halo mask may be modified to enhance the sharpness of an image in a similar manner as the bright halo mask.

Overall, FIG. 6A allows halos in regions with an edge density that is larger than a threshold, while FIG. 6B describes a process for reducing halos in region around text itself. Thus, halos can be formed within the text while halos are reduced around the text due to modifications to the bright halo mask and the dark halo mask.

Although FIGS. 6A and 6B illustrate examples of modifications to bright and dark halo masks, various changes may be made to FIGS. 6A and 6B. For example, FIGS. 6A and 6B are merely meant to illustrate examples of the types of results that could be obtained using the approaches described in this disclosure. Obviously, images of scenes can vary widely, and the results obtained using the approaches described in this disclosure can also vary widely depending on the circumstances.

Figure 7:
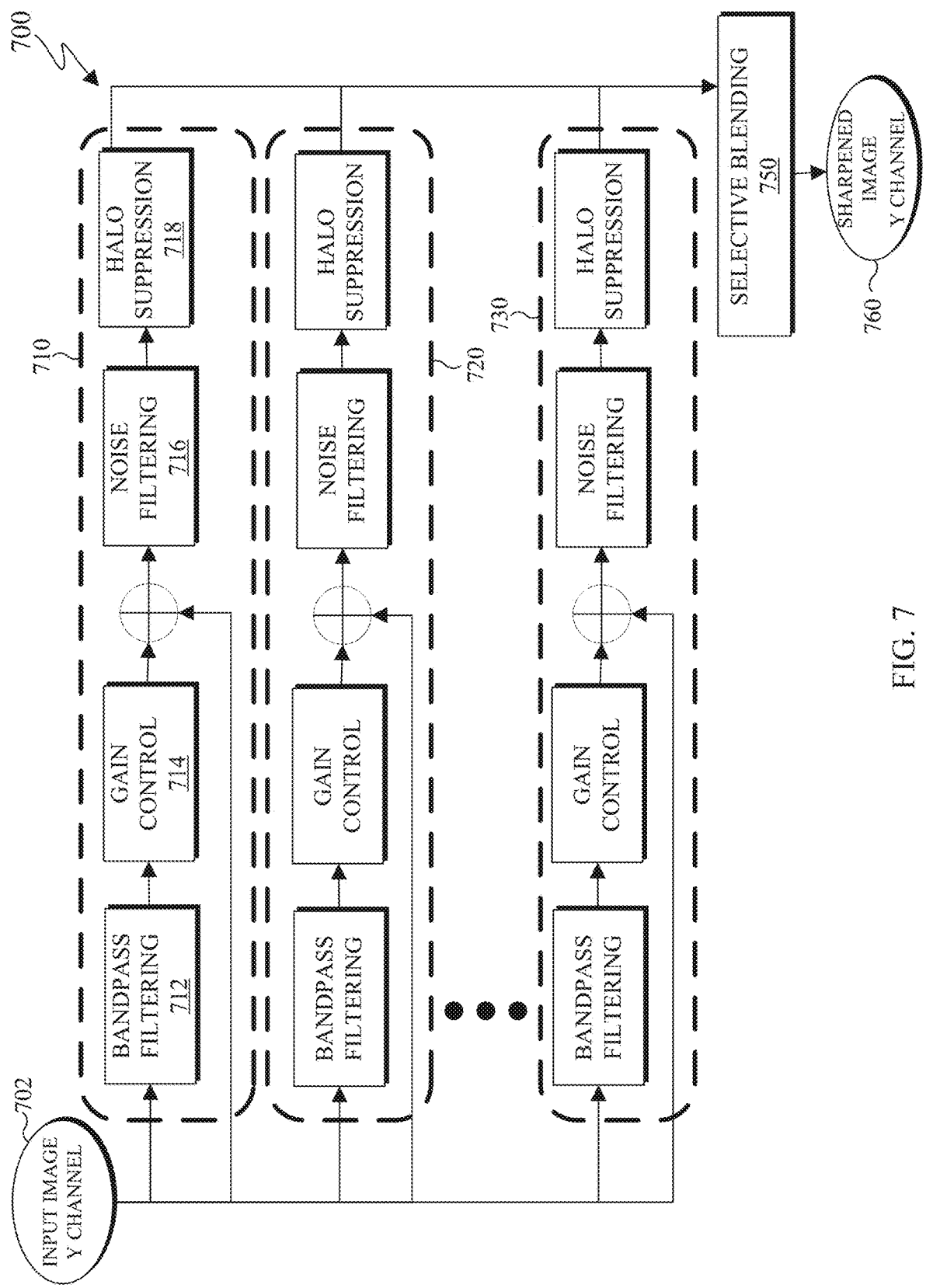
FIGS. 7, 8, and 9 illustrate example processes to perform halo-free sharpening in accordance with this disclosure.
Figure 8:
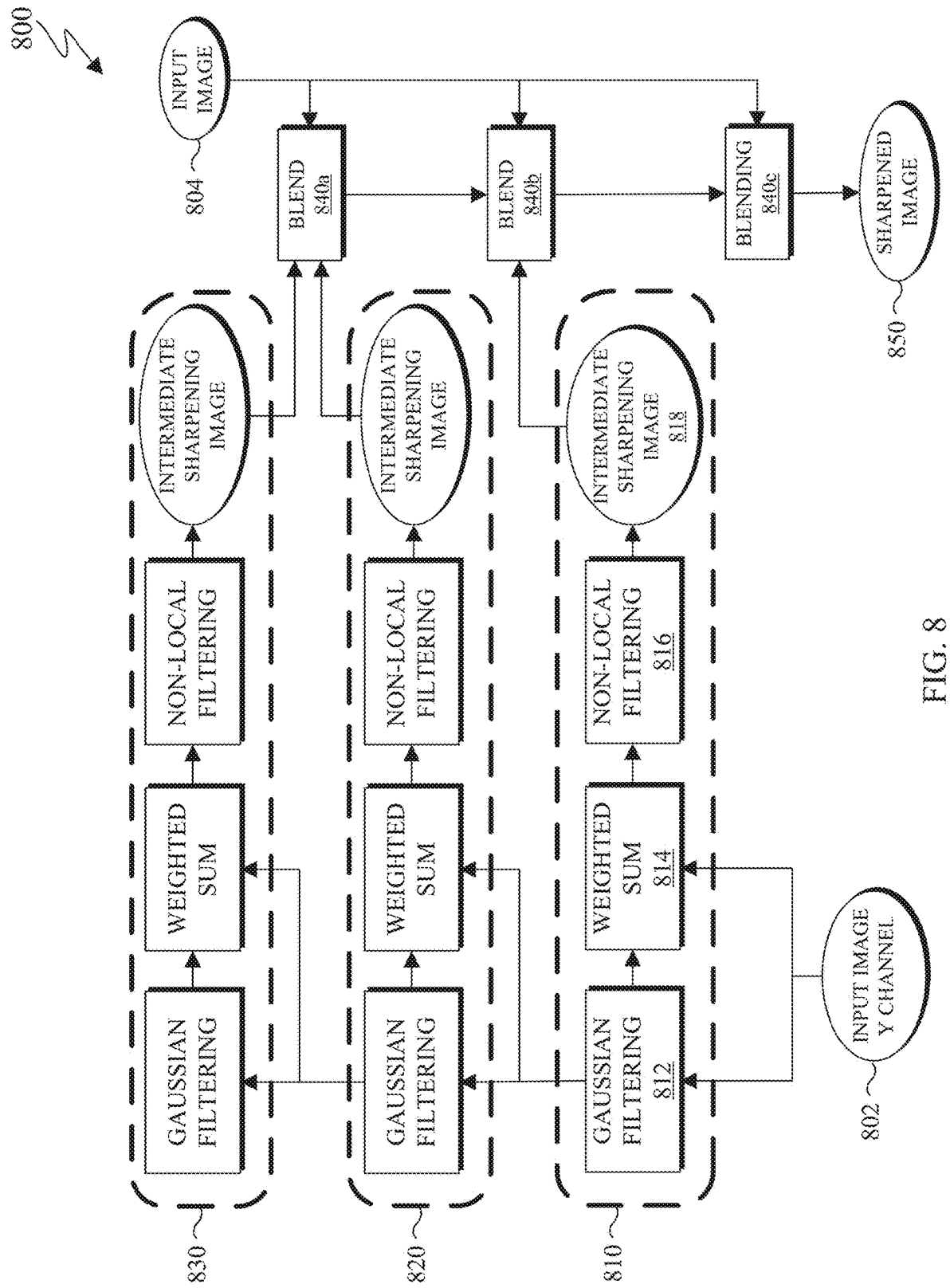
Figure 9:
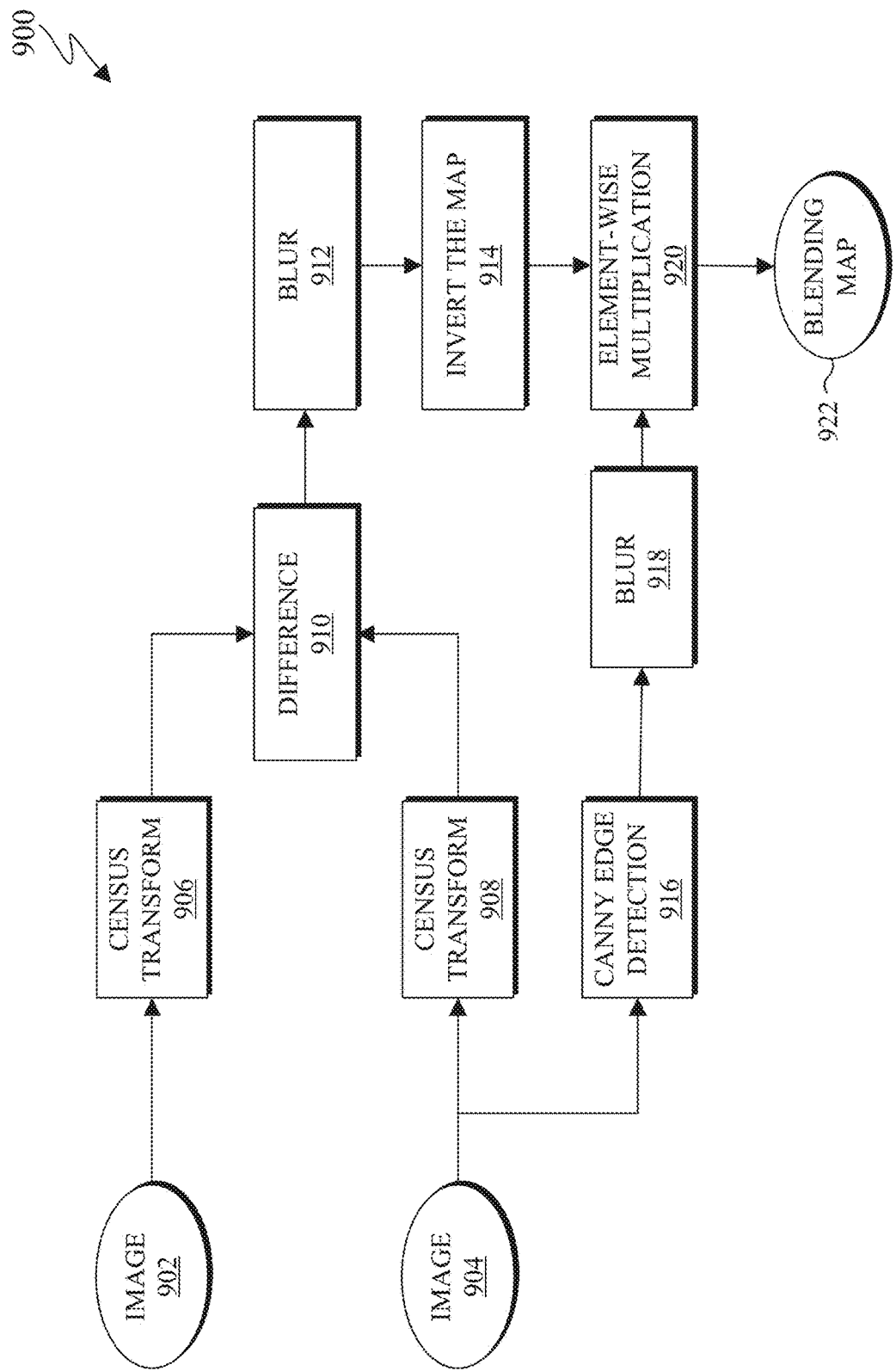

FIGS. 7, 8, and 9 illustrate example processes 700, 800, and 900 to perform halo-free sharpening in accordance with this disclosure. For ease of explanation, the processes 700, 800, and 900 are described as being performed using the electronic device 101 shown in FIG. 1. However, an of the processes 700, 800, and 900 could be used with any other suitable electronic device and in any suitable system, such as when performed by the server 106.

As shown in FIG. 7, the process 700 performs multiple sharpening processes, such as sub-processes 710, 720, and 730, to generate intermediate sharpened images. The intermediate sharpened images are blended via a selective blending operation 750 to generate a sharpened image 760. Each of the sub-processes 710, 720, and 730 includes a bandpass filtering operation 712, a gain control operation 714, a noise filtering operation 716, and a halo suppression operation 718 for generating the intermediate sharpened images.

The process 700 can separate an input image 702 into different channels, such as Y, U, and V channels (where the Y channel is intensity and U and V provide color information). The process 700 applies the bandpass filtering operations 712 to the Y channel of the input image 702. Each of the bandpass filtering operations 712 allows a certain frequency range of the Y channel of the input image 702 to pass while attenuating frequencies of the Y channel of the input image 702 that are not within the certain frequency range. The associated gain control operations 714 amplify the frequencies that passed through the bandpass filtering operations 712. In some embodiments, the sub-processes 710, 720, and 730 can use different bandpass filters such that the gain control operations 714 can amplify different frequencies of the Y channel of the input image 702.

The portions of the Y channel of the input image 702 that were attenuated during the bandpass filtering operations 712 are combined with the output of the gain control operations 714. This enables specified portions of the Y channel of the input image 702 to be modified by the gain control operations 714. The noise filtering operations 716 are performed on the modified Y channel of the input image 702. The outputs of the noise filtering operations 716 are provided to the halo suppression operations 718. The halo suppression operations 718 can generate bright halo masks and dark halo masks (similar to the mask generator 314 of FIG. 3A) and suppress halos (similar to the lower/upper limits operation 316 of FIG. 3A). For example, the halo suppression operations 718, using an edge map of the input image, can generate a bright halo mask and a dark halo mask. The halo suppression operations 718 also modify a level of sharpening at one or more of the edges of the outputs of the noise filtering operations 716 for reducing the appearance of halo artifacts. By modifying a level of sharpening at one or more of the edges, the halo suppression operations 718 generate intermediate sharpened images based on the bandpass filters.

The outputs from the halo suppression operations of the sub-processes 710, 720, and 730 are provided to the selective blending operation 750. The selective blending operation 750 blends particular aspects from the intermediate sharpened images to generate the sharpened image Y channel 760. Note that while the process 700 includes three sub-processes, additional sub-processes can be performed to generate the sharpened image Y channel 760. Also note that similar processes may be used to process other channels of the input image 702.

As shown in FIG. 8, the process 800 performs multiple sharpening processes, such as sub-processes 810, 820, and 830, to generate intermediate sharpened images. The intermediate sharpened images are blended with an input image 804 to generate a sharpened image 850. The sub-processes 810, 820, and 830 can correspond to a cascade of "difference of Gaussian" (DoG) operations that amplify different frequencies of the input image 804. Each of the sub-processes 810, 820, and 830 includes a Gaussian filtering operation 812, a weighted sum operation 814, and a Non-Local (NL) means filtering operation 816 for generating an intermediate sharpening image.

The process 800 can separate the input image 804 into different channels, such as the Y channel 802 and U and V channels. The sub-process 810 applies its Gaussian filtering operation 812 to the Y channel 802 of the input image 804, and the Gaussian filtering operation 812 amplifies certain frequencies of the Y channel 802 of the input image 804. In the sub-process 810, the output of the Gaussian filtering operation 812 is combined with Y channel 802 of the input image 804 via the weighted sum operation 814.

The sub-process 820 applies its Gaussian filtering operation 812 to the output of the Gaussian filtering operation 812 from the sub-process 810. The output of that Gaussian filtering operation 812 in the sub-process 820 is combined with the output of the Gaussian filtering operation 812 from the sub-process 810 via the weighted sum operation 814 in the sub-process 820. The sub-process 830 applies its Gaussian filtering operation 812 to the output of the Gaussian filtering operation 812 from the sub-process 820. The output of that Gaussian filtering operation 812 in the sub-process 830 is combined with the output of the Gaussian filtering operation 812 from the sub-process 820 via the weighted sum operation 814 in the sub-process 830. Essentially, each subsequent Gaussian filtering operation 812 after the first sub-process 810 receives the output from the Gaussian filtering operation 812 of the prior sub-process, and each subsequent weighted sum operation 814 after the first sub-process 810 receives the outputs from the Gaussian filtering operation 812 of the prior sub-process and its sub-process.

The outputs of the weighted sum operations 814 are provided to the NL means filtering operations 816. The NL means filtering operations 816 remove noise from the outputs of the weighted sum operations 814 while preserving the sharpness of the edges to generate intermediate sharpening images 818.

The input image 804 is blended with the intermediate sharpening images 818 from the sub-processes 820 and 830 via a blending operation 840*a*. A blending operation 840*b* blends the input image 804 with the output of the blending operation 840*a* and the intermediate sharpening image 818 from the sub-process 810. A blending operation 840*c* blends the input image 804 with the output of the blending operation 840*b* to generate the sharpened image 850. Note that while the process 800 here includes three sub-processes, additional sub-processes can be performed to generate the sharpened image 850. Also note that similar processes may be used to process other channels of the input image 804.

As shown in FIG. 9, the process 900 performs a blending operation, such as the blending operations 840*a*, 840*b*, and 840*c* of FIG. 8. The process 900 receives at least two different images, such as images 902 and 904, and generates a blending map 922. The blending map 922 can be the output of any of the blending operations 840*a*, 840*b*, or 840*c* of FIG. 8. The blending map 922 indicates locations of an original image, such as the input image 804 of FIG. 8, that should be used in a sharpened image, such as the sharpened image 850 of FIG. 8. The blending map also indicates locations of one or more of the intermediate sharpening images, such as the intermediate sharpening image 818 of FIG. 8, that should be used in the sharpened image 850. The image 904 here can represent an enhanced version of the image 902. For example, if the image 904 is an intermediate sharpened image 818 of FIG. 8, the image 902 may represent the input image 804 of FIG. 8.

A census transform operation 906 compares each pixel of the image 902 with its neighboring pixels. Similarly, a census transform operation 908 compares each pixel of the image 904 with its neighboring pixels. In some embodiments, the neighboring pixels could be within a sliding window that is three pixels by three pixels. Other size windows can also be used for describing the size of the neighborhood. After comparing a pixel to its neighboring pixels, each of the census transform operations 906 and 908 records which pixel around the center pixel has the smallest pixel value.

A difference operation 910 compares the outputs of the census transform operation 906 and 908. Based on the comparison, the difference operation 910 identifies pixels of the recorded outputs of the census transform operations 906 and 908 whose difference is larger than a threshold. A higher difference between pixels as determined using the outputs of the census transform operations 906 and 908 could indicate an artifact that was generated by the sharpening performed via one of the sub-processes 810, 820, 830 of FIG. 8.

A blurring operation 912 blurs the map based on the combined outputs of the census transforms operations 906 and 908. In some embodiments, the amount of blurring provided by the blurring operation 912 is predetermined. In other embodiments, the amount of blurring provided by the blurring operation 912 is based on the differences from the difference operation 910. An inversion operation 914 inverts the map that was blurred by the blurring operation 912. For example, the inversion operation 914 can convert high values to low values and low values to high values.

A canny edge detection operation 916 identifies edges within the image 904. The canny edge detection operation 916 can generate an edge map. In some embodiments, the canny edge detection operation 916 and the census transform operations 906 and 908 are performed in parallel. Note, however, that this is not required. Also note that other edge detection operations can be used in addition to or in place of the canny edge detection operation 916. A blurring operation 918 blurs the edge map that was generated by the canny edge detection operation 916.

An element-wise multiplication operation 920 generates the blending map 922 by combining the edge map generated by the canny edge detection operation 916 and the inverted map based on the census transform operations 906 and 908. Due to the element-wise multiplication operation 920, the blending map 922 includes more information from locations of the image 904 that do not produce halos while including more information from the image 902 at locations where artifacts are formed due to the sharpening of the image 904. For example, the blending map 922 may indicate that the image 904 would be more blended around certain edges while maintaining the sharpening effect elsewhere in the image.

Although FIGS. 7, 8, and 9 illustrate examples of processes to perform halo-free sharpening, various changes may be made to FIGS. 7, 8, and 9. For example, while shown as a series of steps, various steps in FIGS. 7, 8, and 9 may overlap, occur in parallel, occur in a different order, or occur any number of times. As another example, steps may be omitted or replaced by other steps.

Figure 10A:
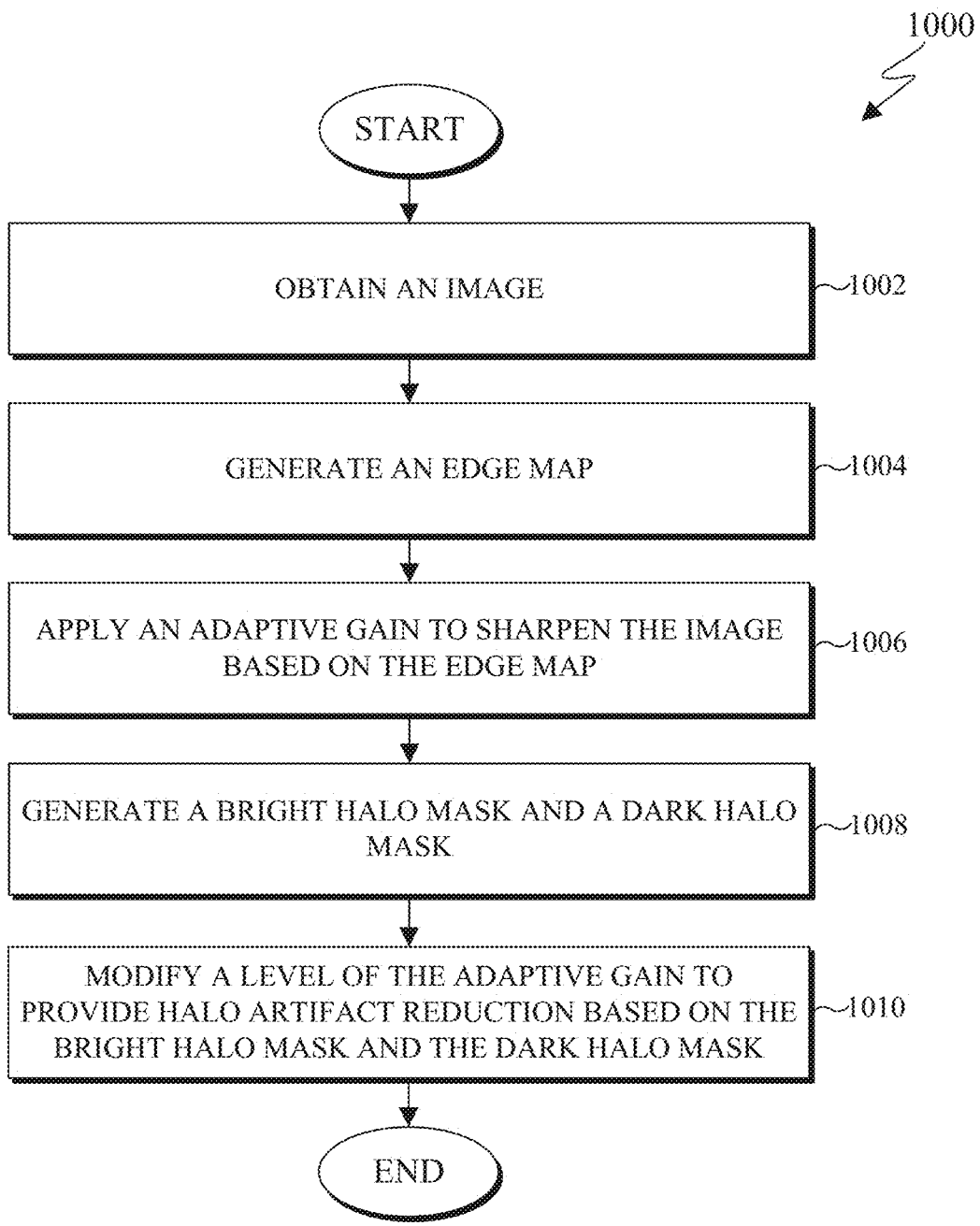
FIGS. 10A and 10B illustrate example methods for image sharpening in accordance with this disclosure.
Figure 10B:
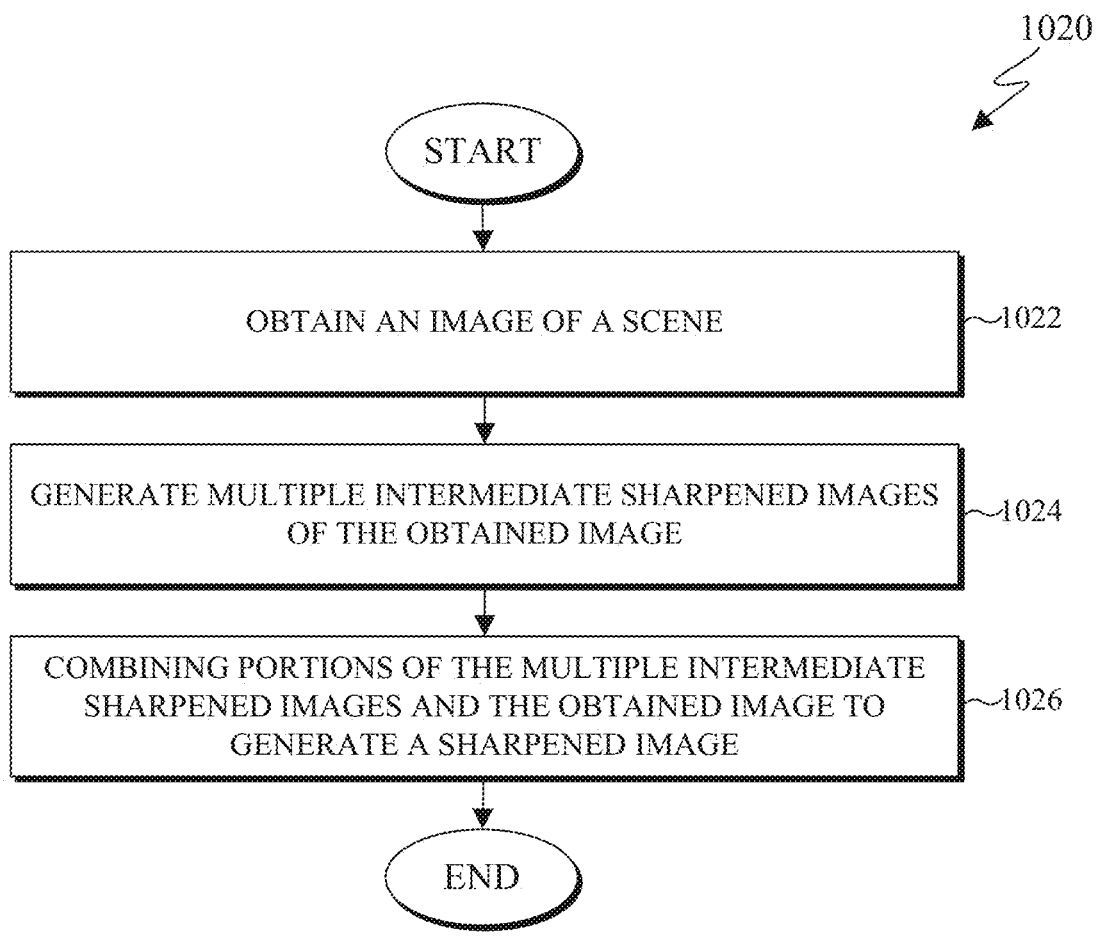

FIGS. 10A and 10B illustrate example methods 1000 and 1020 for image sharpening in accordance with this disclosure. For ease of explanation, the methods 1000 and 1020 shown in FIGS. 10A and 10B are described as being performed using the electronic device 101 shown in FIG. 1. However, the methods 1000 and 1020 shown in FIGS. 10A and 10B could be used with any other suitable electronic device and in any suitable system, such as when performed by the server 106.

As shown in FIG. 10A, in step 1002, the electronic device 101 obtains an image, such as the input image 302 of FIG. 3A, using at least one sensor, such as one or more sensors 180 of FIG. 1. The obtained image can include visual content. In step 1004, the electronic device 101 generates an edge map from the obtained image. The edge map indicates edges of the visual content within the image. In step 1006, the electronic device 101 applies an adaptive gain to the input obtained image. The adaptive gain sharpens the obtained image, such as by applying a specified level of gain at a center of an edge as indicated by the edge map and reducing the amount of gain incrementally as distance from the center of the edge increases. For example, the sharpening gain can be large at an edge center and decay as the distance from the edge center increases.

In step 1008, the electronic device 101 generates a bright halo mask and a dark halo mask based on the edge map. For example, a high-pass signal can be applied to the obtained image, the bright halo mask can indicate locations where the high-pass signal is positive, and the dark halo mask can indicate locations where the high-pass signal is negative. The bright halo mask indicates locations of the obtained image that could include a bright halo when the obtained image is sharpened. Accordingly, the bright halo mask indicates an upper sharpening limit at locations where bright halo artifacts could appear. The dark halo mask indicates locations of the obtained image that could include a dark halo when the obtained image is sharpened. Accordingly, the dark halo mask indicates a lower sharpening limit at locations where dark halo artifacts could appear.

In step 1010, the electronic device 101 modifies a level of the adaptive gain to reduce halo artifacts from appearing in the sharpened image based on the bright halo mask and the dark halo mask. For example, the level of sharpening can be reduced at locations of the sharpened image that correspond to lines of the bright halo mask and the dark halo mask in order to prevent artifacts such as halos.

In some embodiments, the electronic device 101 can modify the bright and dark halo masks based on the visual content within the image. For example, at locations of the input image that have a high edge density (as determined by comparing the number of edges within a specified distance or area to a threshold), the electronic device 101 can reduce the strength of one or both of the halo masks in order to allow halos to appear. Locations of the edge map that have a high edge density could correspond to locations of the obtained image with fine details, thin structures, and text.

The electronic device 101 can also identify text within an image. After identifying text, the electronic device 101 could reduce the number of edges at locations where the text is identified. Reducing the number of edges at locations where the text is identified enables the electronic device 101 to reduce halos using the bright and dark halo masks. In some embodiments, the electronic device 101 uses a bright halo mask and/or a dark halo mask to reduce halos that appear around text while allowing halo artifacts to appear within the lines that form the text itself.

As shown in FIG. 10B, in step 1022, the electronic device 101 obtains an image, such as the input image 302 of FIG. 3A, using at least one sensor, such as one or more sensors 180 of FIG. 1. The obtained image can include visual content. In step 1024, the electronic device 101 generates multiple intermediate sharpened images of the obtained image. In some embodiments, the electronic device 101 can perform multiple Gaussian filtering operations. Each Gaussian filtering operation changes a certain aspect of the input signal of the obtained image. For example, each Gaussian filtering operation can be used to amplify different frequencies of the received input. For each Gaussian filtering operation, the electronic device 101 can perform a non-local filtering for noise reduction to generate one of the intermediate sharpened images. As a particular example, a first Gaussian filtering operation can be performed based on an input signal of the obtained image to generate a first filtered signal. Thereafter, a second Gaussian filtering operation can be performed based on the first filtered signal. Thus, each subsequent Gaussian filtering operation uses the output of the previous Gaussian filtering operation.

In step 1026, the electronic device 101 combines portions of the multiple intermediate sharpened images together with the obtained image to generate a sharpened image. For example, the electronic device 101 can generate a blending map based on a canny edge detection and a census transform of two or more of the multiple intermediate sharpened images. The blend map can be used to combine the multiple intermediate sharpened images and the obtained image together for generating the sharpened image.

Although FIGS. 10A and 10B illustrate examples of methods 1000 and 1020 for image sharpening, various changes may be made to FIGS. 10A and 10B. For example, while shown as a series of steps, various steps in FIGS. 10A and 10B may overlap, occur in parallel, occur in a different order, or occur any number of times. As another example, steps may be omitted or replaced by other steps.

Figure 11A:
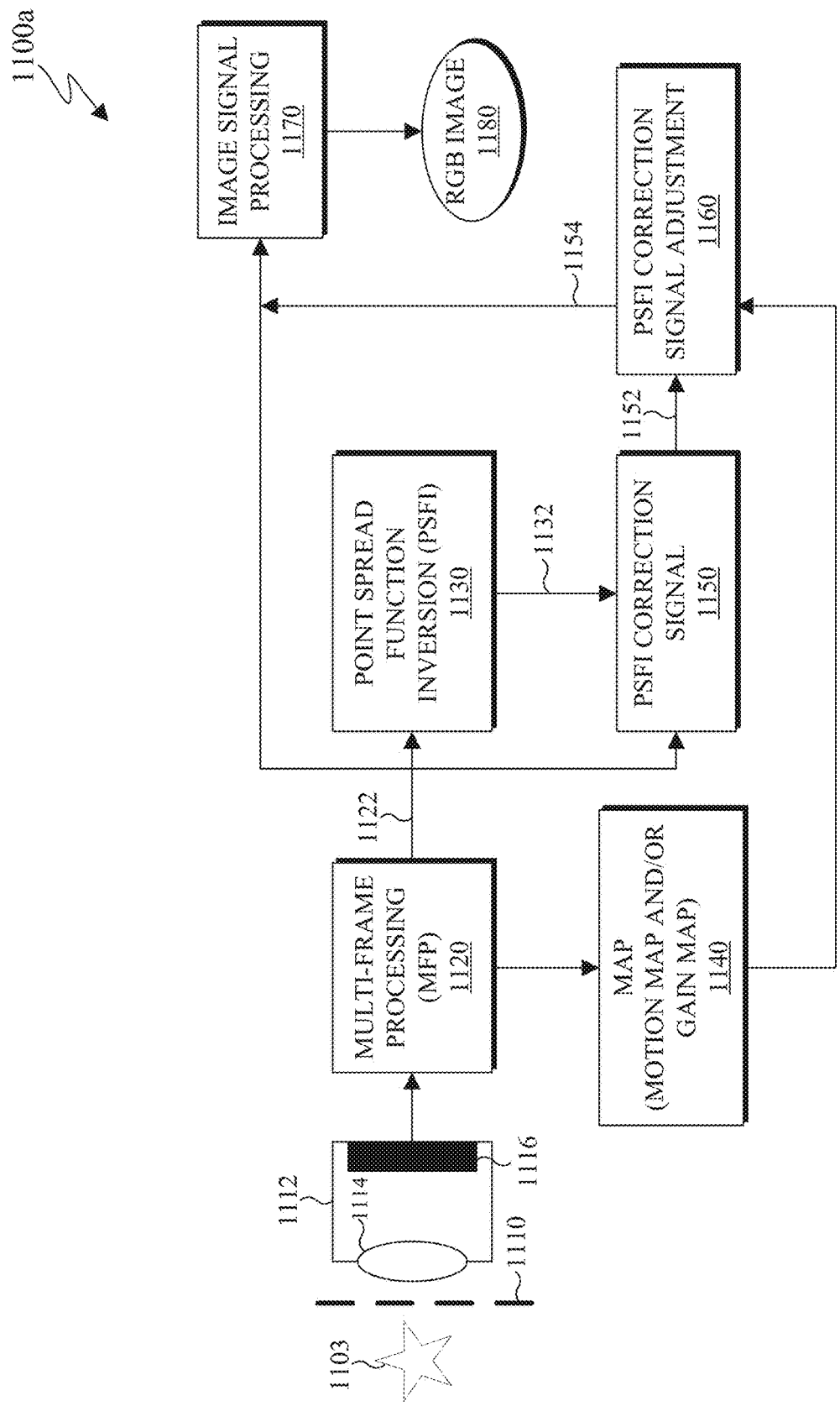
FIGS. 11A and 11B illustrate example processes for generating an image captured by an under-display camera (UDC) in accordance with this disclosure.
Figure 11B:
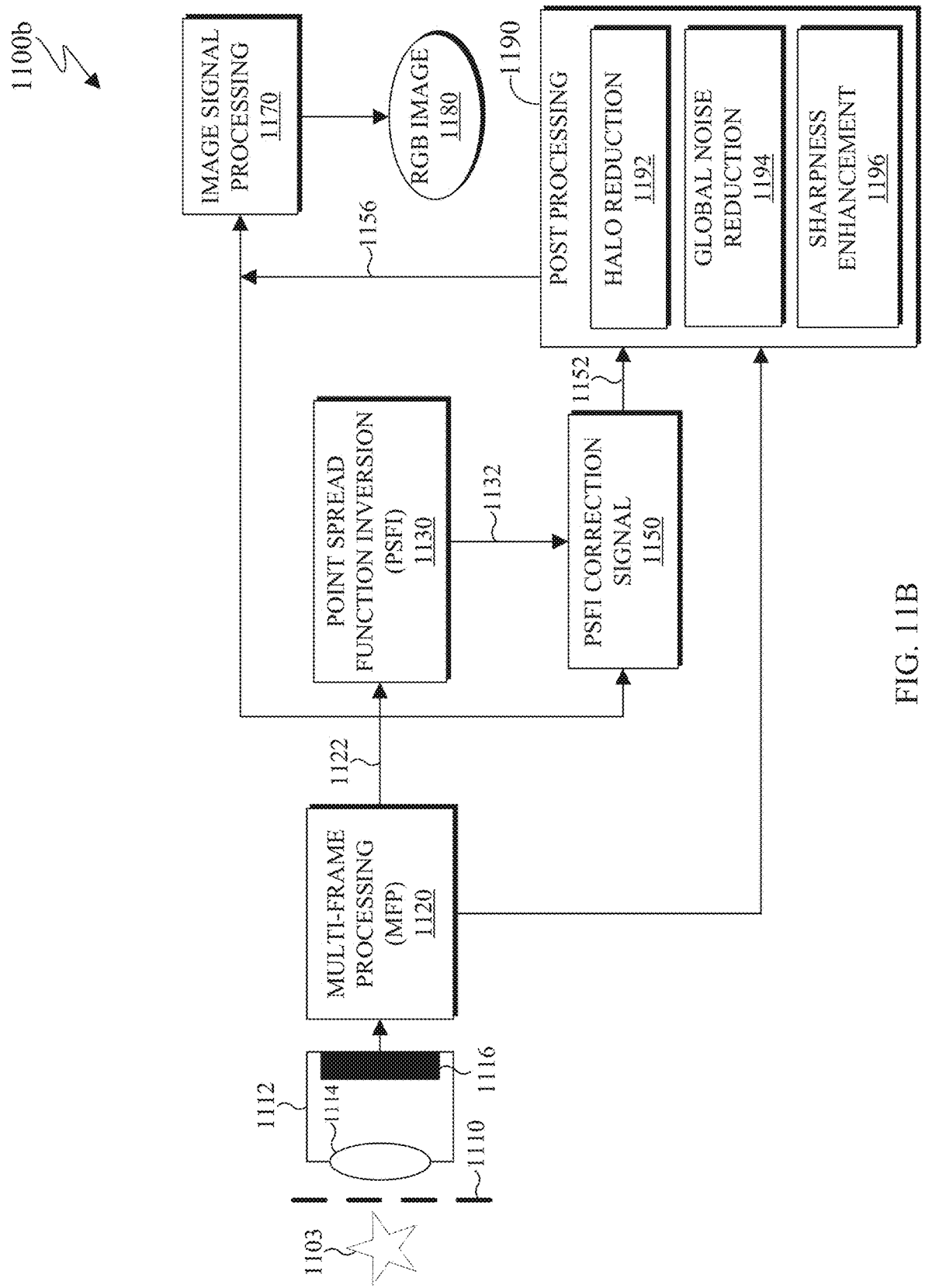
Figure 11C:
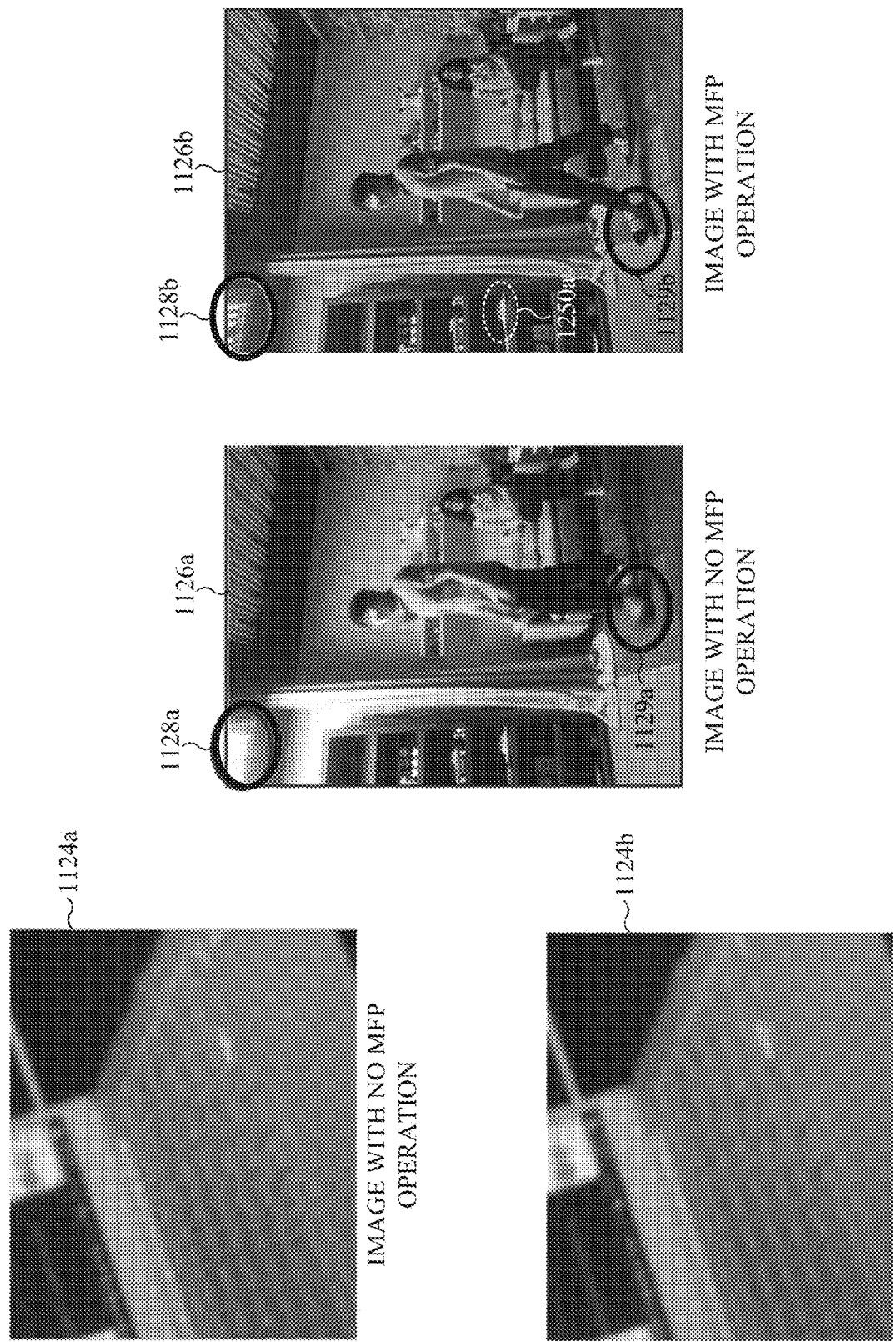
FIG. 11C illustrates example images with and without the multi-frame processing operation of FIGS. 11A and 11B in accordance with this disclosure.
Figure 11D:
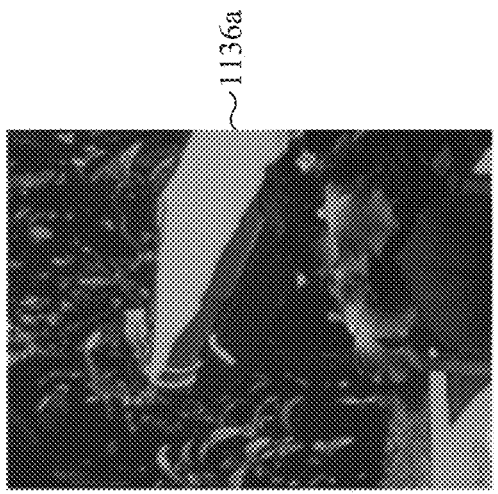
FIG. 11D illustrates example images with and without a point spread function inverse (PSFI) operation of FIGS. 11A and 11B in accordance with this disclosure.
Figure 11D:
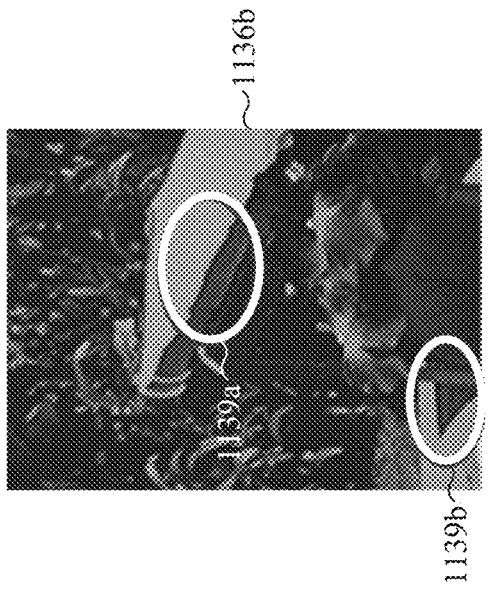
Figure 11D:
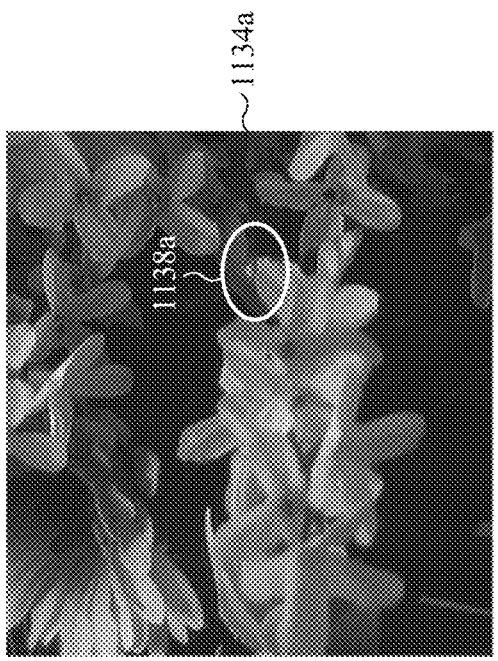
Figure 11D:
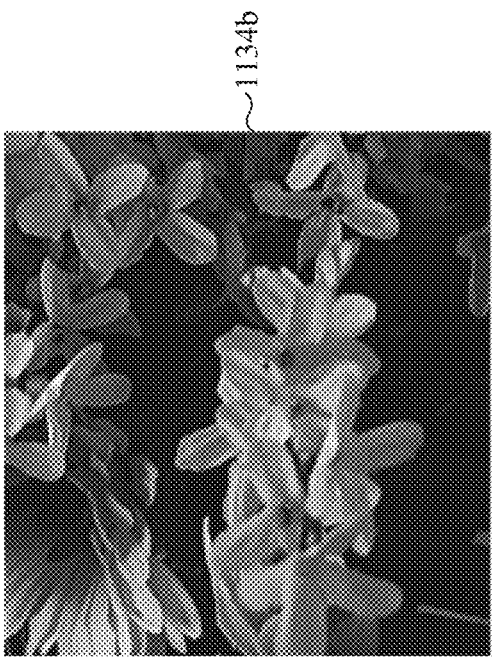

FIGS. 11A and 11B illustrate example processes 1100a-1100b for generating an image captured by an under-display camera (UDC) in accordance with this disclosure. The processes 1100a-1100b as shown in FIGS. 11A and 11B may be similar to portions of the process 200 shown in FIG. 2. For ease of explanation, the processes 1100a-1100b shown in FIGS. 11A and 11B are described as being performed using the electronic device 101 of FIG. 1. However, the processes 1100a-1100b shown in FIGS. 11A and 11B could be used with any other suitable electronic device and in any suitable system, such as when performed by the server 106. FIG. 11C illustrates example images with and without the multi-frame processing (MFP) operation of FIGS. 11A and 11B in accordance with this disclosure. FIG. 11D illustrates example images with and without a point spread function inverse (PSFI) operation of FIGS. 11A and 11B in accordance with this disclosure.

The processes 1100a-1100b are generally used for processing multiple image frames of a scene that were captured using different exposures by one or more image sensors (such as one or more sensors 180) located behind a display (such as the display 160) to generate an image, such as an RGB image 1180. To generate the RGB image 1180, the electronic device 101 performs a multi-frame processing operation 1120, a PSFI operation 1130, and an image signal processing operations 1170. The process 1100a of FIG. 11A reduces artifacts that are created by the PSFI operation 1130, and the process 1100b of FIG. 11B performs one or more post-processing operations 1190 (such as a halo reduction operation 1192, a global noise reduction operation 1194, and a sharpness enhancement operation 1196). Although illustrated as separate processes, the processes 1100a-1100b can be combined into a single process. For example, the one or more post-processing operations 1190 of FIG. 11B can be performed after a PSFI correction signal adjustment operation 1160 of FIG. 11A.

As shown in FIGS. 11A and 11B, each process 1100a and 1100b involves the capture of multiple image frames of different exposure values. Different exposure settings are used to obtain the different exposure values. Each exposure setting is typically associated with different settings for at least one image sensor, such as different apertures, shutter speeds, sensor sensitivities, and the like. For example, a shorter-exposure image frame is typically darker, lacks image details, and has more noise compared to a longer-exposure image frame. As a result, the shorter-exposure image frame may include one or more regions that are under-exposed, while the longer-exposure image frame may include one or more regions that are over-exposed. Also, the shorter-exposure image frame can capture little or no movement of an object within the image, while the longer-exposure image frame may include areas that are blurry due to the object moving or movement of the image sensor itself. In some embodiments, the multiple image frames can be raw Bayer frames from a UDC 1112.

The UDC 1112 here includes one or more lenses 1114 and an image sensor 1116. The image sensor 1116 can be the same as or similar to a sensor 180 of FIG. 1. The one or more lenses 1114 focus light in order for the image sensor 1116 to capture the multiple image frames. The multiple images frames can capture a scene that includes an object 1103. The UDC 1112 is located behind a display 1110 that can display content to a user. The display 1110 can be the same as or similar to the display 160 of FIG. 1. The UDC 1112 is not visible via an external inspection of the electronic device 101 since it is hidden by the display 1110. Due to the location of the UDC 1112 being behind the display 1110, a diffraction pattern caused by the display 1110 can introduce artifacts, such as blurring and diffraction halos, into the image.

In some instances, during a capture operation, the processor 120 can control the UDC 1112 of the electronic device 101 so that multiple image frames are captured rapidly, such as in a burst mode. A capture request that triggers the capture of the multiple image frames represents any suitable command or input indicating a need or desire to capture an image of a scene using the electronic device 101, such as when the capture request is initiated in response to a user's pressing of a "soft" button presented on the display 1110 or the user's pressing of a "hard" button. The multiple image frames here may be produced in any suitable manner, such as where each image frame is captured multiple different UDCs 1112.

The MFP operation 1120 of FIGS. 11A and 11B receives the image frames of different exposure values and generates a single blended output image 1122. By blending the multiple image frames, the MFP operation 1120 provides an HDR effect, motion deblurring, and noise reduction, and the MFP operation 1120 reduces the effects of over- and under-exposure issues. The blended output image 1122 can include a high level of noise in areas that include motion and/or high gain. The MFP operation 1120 can also generate a map 1140 when combining the image frames into the blended output image 1122. The map 1140 can be a motion map and/or a gain map.

FIG. 11C example images with and without the MFP operation 1120. More specifically, an image frame 1124a illustrates an image when no MFP operation 1120 is performed, while an image frame 1124b illustrates an image when the MFP operation 1120 is performed. As can be seen here, the image frame 1124a includes more noise than the image frame 1124b. By blending multiple image frames of different exposure values, the MFP operation 1120 can generate the image frame 1124b, which includes less noise than the image frame 1124a. Similarly, an image frame 1126a of FIG. 11C illustrates an image when no MFP operation 1120 is performed, while an image frame 1126b illustrates an image when the MFP operation 1120 is performed. As can be seen here, the image frame 1126a includes an over-exposed region 1128a and a blurry region 1129a, which are both due to a longer exposure. When multiple image frames of different exposures are blended together by the MFP operation 1120, the resulting image frame 1126b illustrates a single image that is properly exposed based on portions from the image frames of different exposures. The regions 1128b and 1129b of the image frame 1126b are properly exposed, which is obtained by using portions from different image frames that used different exposures.

The PSFI operation 1130 of FIGS. 11A and 11B receives the blended output image 1122 of the MFP operation 1120. The PSFI operation 1130 reduces the adverse effects of the UDC 1112. For example, since the UDC 1112 is located behind the display 1110, many of the captured image frames can include diffraction and distortion artifacts, such as diffraction halo. In some cases, a grid pattern of the display panel included in the display 1110 can cause light that passes through the panel to diffract. Therefore, the PSFI operation 1130 inverts the point spread function of the blended output image 1122 to reduce artifacts that are created by using the UDC 1112 (instead of one or more image sensors not located behind a display) to generate a modified image frame 1132. The PSFI operation 1130 can also perform image sharpening in order to generate the modified image frame 1132.

FIG. 11D illustrates example images with and without the PSFI operation 1130. More specifically, an image frame 1134a illustrates an image when no PSFI operation 1130 operation is performed, while an image frame 1134b illustrates an image when the PSFI operation 1130 is performed. As can be seen here, the image frame 1134a is blurry compared to the image frame 1134b. Additionally, the image frame 1134a includes diffraction halos around certain edges, such as diffraction halo 1138a, while the image frames 1134b does not include any defection halos. As such, the PSFI operation 1130 sharpens an input image and removes artifacts such as diffraction halos. Similarly, an image frame 1136a illustrates an image when no PSFI operation 1130 operation is performed, while an image frame 1136b illustrates an image when the PSFI operation 1130 is performed. As can be seen here, the image frame 1136a is blurry compared to the image frame 1134b. However, the image frames 1136b includes additional artifacts, such as halos 1139a and 1139b. The halos 1139a and 1139b can be created due to over-sharpening the image and are similar to the bright and dark halos discussed above. Although not shown in these images of FIG. 11D, the PSFI operation 1130 can increase noise in processed image frames, such as by increasing noise in areas of an image frame that already include noise.

A PSFI correction signal operation 1150 of FIG. 11A receives the modified image frame 1132 from the PSFI operation 1130 and the blended output image 1122 from the MFP operation 1120. The PSFI correction signal operation 1150 generates a signal that is used to reduce the artifacts and noise generated by the PSFI operation 1130. In particular, the PSFI correction signal operation 1150 generates a PSFI correction signal 1152 that is based on a comparison of the input of the PSFI operation 1130 and the output from the PSFI operation 1130. In some embodiments, the PSFI correction signal operation 1150 generates a PSFI correction signal 1152 that is based on the difference between the input (such as the blended output image 1122) and the output (such as the modified image frame 1132) of the PSFI operation 1130. Thus, the PSFI correction signal 1152 might be defined as:

$$C=C(A,B) \tag{6}$$

$$C(A,B)=B-A \tag{7}$$

In Equation (6), C represents the PSFI correction signal and is a function based on A, B, and the PSFI correction signal 1152. A is the input to the PSFI operation 1130, such as the blended output image 1122. B is the output of the PSFI operation 1130, such as the modified image frame 1132. In some embodiments, the PSFI correction signal is an m by n matrix. Equation (7) describes an example function of the PSFI correction signal C, which is the difference between the output of the PSFI operation 1130 and the input to the PSFI operation 1130.

The PSFI correction signal adjustment operation 1160 of FIG. 11A receives the PSFI correction signal 1152 from the PSFI operation 1130 and the map 1140. The map 1140 can represent or be based on a motion map, a gain map, or both. The motion map and the gain map can be generated by the MFP operation 1120. The PSFI correction signal adjustment operation 1160 generates a modified correction signal 1154 based on the map 1140 and the PSFI correction signal 1152. For example, the PSFI correction signal adjustment operation 1160 may modify the PSFI correction signal 1152 (which is the difference between the input and output of the PSFI operation 1130) by applying a gain based on the map 1140 to suppress noise that was enhanced due to the PSFI operation 1130. Areas of the blended output image 1122 that include high noise can correspond to high motion areas (as indicated by the motion map) and/or high gain areas (as indicated by the gain map). Since the PSFI operation 1130 can increase noise, the PSFI correction signal adjustment operation 1160 uses the map 1140 to identify areas that already include high noise and reduces the gain applied in those areas by the PSFI operation 1130. For example, the PSFI correction signal adjustment operation 1160 can use the map 1140 to identify the areas of high noise and modify the PSFI correction signal 1152 at those locations to reduce the noise enhanced by the PSFI operation 1130.

In some embodiments, the PSFI correction signal adjustment operation 1160 uses a motion map when generating the modified correction signal 1154. When using a motion map, the PSFI correction signal adjustment operation 1160 may normalize the motion map to values between zero and one. For example, each pixel of the motion map can be normalized such that the pixel values range between zero and one. Areas with little or no motion (such as values close to one) correspond to areas where the MFP operation 1120 performed lots of blending to reduce noise. In contrast, areas with motion (such as values close to zero) correspond to areas where the MFP operation 1120 performed little or no blending. As such, areas with more motion typically include high levels of noise than areas with no motion. For example, a function T based on the motion map can be defined as:

$$T=M/\max(M) \tag{8}$$

Here, T is the normalized motion map, and M is the motion map generated by the MFP operation 1120. To generate the normalize motion map T, the values of each pixel in the motion map M are divided by the maximum value in the motion map.

In other embodiments, the PSFI correction signal adjustment operation 1160 uses a gain map when generating the modified correction signal 1154. When using a gain map, the PSFI correction signal adjustment operation 1160 may normalize the gain map to values between zero and one. Values close to zero may correspond to areas with high gain, and values close to one may correspond to areas with low gain. After normalizing the gain map, the PSFI correction signal adjustment operation 1160 may take an inverse of the normalized gain map such that values close to one correspond to areas with high gain and values close to zero correspond to areas with low gain. For example, a normalized gain map and the function T based on the gain map can be defined as:

$$\text{Normalized Gain Map}=G/\max(G) \tag{9}$$

$$T=1-(G/\max(G)) \tag{10}$$

Here, G is the gain map. To generate the normalize gain map, the values of each pixel in the gain map G are divided by the maximum value in the gain map. In Equation (10), T is the inverted normalized gain map of Equation (9).

In still other embodiments, the PSFI correction signal adjustment operation 1160 uses both the normalized motion map (as described in Equation (8) above) and the inverted normalized gain map (as described in Equation (10) above) when generating the modified correction signal 1154. For example, when using both the motion map and the gain map, the PSFI correction signal adjustment operation 1160 may perform an element-wise multiplication between the normalized motion map and the inverted normalized gain map. In some cases, for example, a function T based on both the motion map and the gain map can be defined as:

$$T=(M/\max(M))\cdot *(1-(G/\max(G))) \tag{11}$$

Here, the expression '·*' represents an element-wise multiplication between the normalized motion map of Equation (8) and the inverted normalized gain map of Equation (10).

The PSFI correction signal adjustment operation 1160 generates the modified correction signal 1154 based on the PSFI correction signal 1152 and the function T, which is based on Equation (8), (10), or (11). The modified correction signal 1154 can be defined as:

$$D = C \cdot {}^*T \tag{12}$$

Here, D is the modified correction signal 1154 and is based on the element-wise multiplication between the PSFI correction signal 1152 and T.

When the function T corresponds to the normalized motion map, element-wise multiplication between the PSFI correction signal 1152 and the motion map prevents sharpening in areas with high motion and sallow sharpening in areas with no motion. Since areas with high motion have values close to zero, the element-wise multiplication with the PSFI correction signal 1152 prevents the PSFI correction signal 1152 from sharpening in those areas. Similarly, since areas with little or no motion have values close to one, the element-wise multiplication with the PSFI correction signal 1152 causes those areas to be modified according to the PSFI correction signal 1152.

When the function T corresponds to the inverted normalized gain map, element-wise multiplication between the PSFI correction signal 1152 and the inverted gain map prevents sharpening in areas with high gain and allows sharpening in areas with low gain. For instance, values of the normalized gain map that are close to one indicate high gain, but inversion areas with high gain are assigned values close to zero and areas with low gain are assigned values close to one. Since areas with high gain have values close to zero, the element-wise multiplication with the PSFI correction signal 1152 prevents the PSFI correction signal 1152 from sharpening in those areas. Similarly, since areas with little or no gain have values close to one, the element-wise multiplication with the PSFI correction signal 1152 causes those areas to be modified according to the PSFI correction signal 1152.

In some embodiments, the modified correction signal 1154 is combined with the PSFI input signal, such as the blended output image 1122, to generate a noise-reduced UDC output. The noise-reduced UDC output is received by the ISP operation 1170. The ISP operation 1170 generates the RGB image 1180 based on the noise-reduced UDC output. For example, the ISP operation 1170 may convert the noise-reduced UDC output into the RGB domain in order to generate the RGB image 1180.

In other embodiments, the PSFI correction signal 1152 can be used by the post-processing operation 1190 of FIG. 11B to generate additional improvements to the image frame. For example, using the PSFI correction signal 1152 and information obtained from the MFP operation 1120, the post-processing operation 1190 can perform a halo reduction operation 1192, a global noise reduction operation 1194, and/or sharpness enhancement operation 1196. The global noise reduction operation 1194 is different than the noise reduction based on the modified correction signal 1154 of FIG. 11A. The modified correction signal 1154 reduces noise that was increased by the PSFI operation 1130, while the global noise reduction operation 1194 reduces overall noise. The sharpness enhancement operation 1196 is also different than the sharpness enhancement generated by the PSFI operation 1130.

The results of the post-processing operation 1190 are combined with the PSFI input signal, such as the blended output image 1122, to generate a noise-reduced and processed UDC output. As described above, the noise-reduced and processed UDC output is received by the ISP operation 1170. The ISP operation 1170 generates the RGB image 1180 based on the noise-reduced and processed UDC output. For example, the ISP operation 1170 may convert the noise-reduced UDC output into the RGB domain in order to generate the RGB image 1180.

Although FIGS. 11A and 11B illustrate examples of processes for generating an image captured by a UDC, various changes may be made to FIGS. 11A and 11B. For example, while shown as a specific sequence of operations, various operations shown in FIGS. 11A and 11B could overlap, occur in parallel, occur in a different order, or occur any number of times. Also, the specific operations shown in FIGS. 11A and 11B are examples only, and other techniques could be used to perform each of the operations shown in FIGS. 11A and 11B. In addition, the generation of RGB images 1180 is for illustration only, and other types of images may be generated here. Although FIGS. 11C and 11D illustrate examples of images with and without the MFP operation and the PSFI operation, various changes may be made to FIGS. 11C and 11D. For example, FIGS. 11C and 11D are merely meant to illustrate examples of the types of results that could be obtained using the approaches described in this disclosure. Obviously, images of scenes can vary widely, and the results obtained using the approaches described in this patent document can also vary widely depending on the circumstances.

Figure 12A:
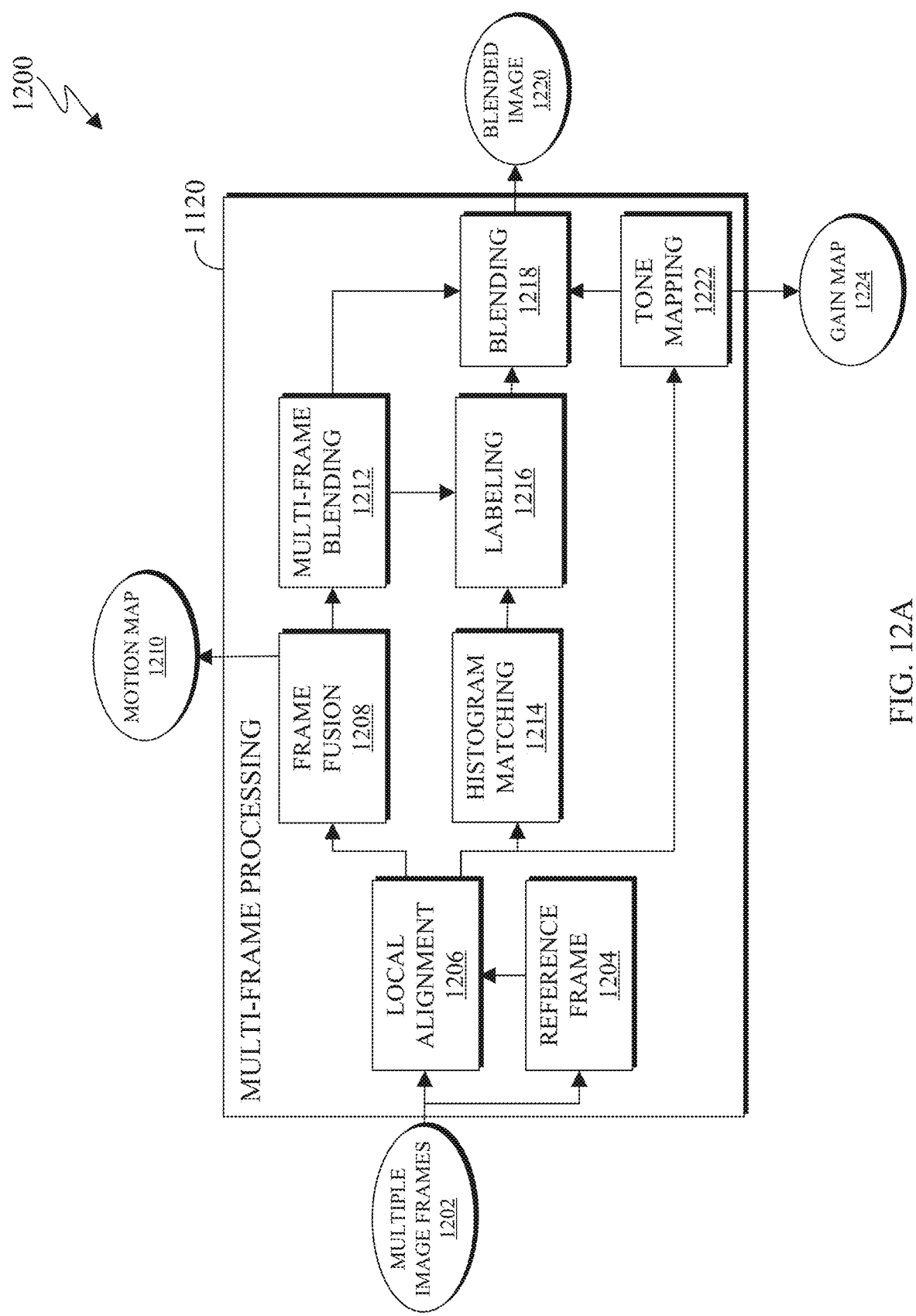
FIG. 12A illustrates an example process for a multi-frame processing operation of FIGS. 11A and 11B in accordance with this disclosure.

FIG. 12A illustrates an example process 1200 for a multi-frame processing operation 1120 of FIGS. 11A and 11B in accordance with this disclosure. For ease of explanation, the process 1200 is described as being performed using the electronic device 101 of FIG. 1. However, any other suitable electronic device in any suitable system may be used, such as when performed by the server 106.

The process 1200 is generally used to capture multiple image frames 1202 of a scene at different exposures and process the image frames to generate a blended image 1220. The multiple image frames 1202 can be the same as or similar to the multiple image frames 202 of FIG. 2. In some embodiments, multiple image frames 1202 includes two or more image frames that are captured by a UDC, such as the UDC 1112 of FIGS. 11A and 11B. The blended image 1220 is a composite or final image of the scene and can be the same as or similar to the blended output image 1122 of FIGS. 11A and 11B. The process 1200 also generates a motion map 1210 and a gain map 1224, which can be the same as or similar to the map 1140 of FIG. 11A.

As shown in FIG. 12A, one of the multiple image frames 1202 can be selected and used as a reference image frame, such as a reference frame 1204. One or more other image frames of the multiple image frames 1202 can be used as one or more non-reference image frames. The image frames 1202 are provided to a local alignment operation 1206, which generally operates to align each non-reference image frame with respect to the selected reference frame 1204. For example, the local alignment operation 1206 may modify each non-reference image frame so that particular features in the non-reference image frame are aligned with corresponding features in the reference frame 1204. Alignment may be needed to compensate for misalignment caused by the electronic device 101 moving or rotating in between image captures, which causes objects in the multiple image frames 1202 to move or rotate slightly (as is common with handheld devices). In some embodiments, the multiple image frames 1202 can be aligned both geometrically and photometrically. Note that the reference frame 1204 may or may not be modified during the alignment, and the non-reference image frame(s) could represent the only image frame(s) modified during the alignment.

The aligned image frames are provided to a frame fusion operation 1208. The frame fusion operation 1208 generally operates to identify the changes between the multiple image frames 1202 in order to generate the motion map 1210. The motion map 1210 identifies the amount of motion or changes between pixels of the aligned image frames. In some embodiments, areas with more motion correspond to areas in which less blending is performed by blending operations 1212 and 1218 in order to present an area of the image that includes little or no motion blur. The blending operations 1212 and 1218 can be the same as or similar to the image blending operation 206 of FIG. 2.

Figure 12C:
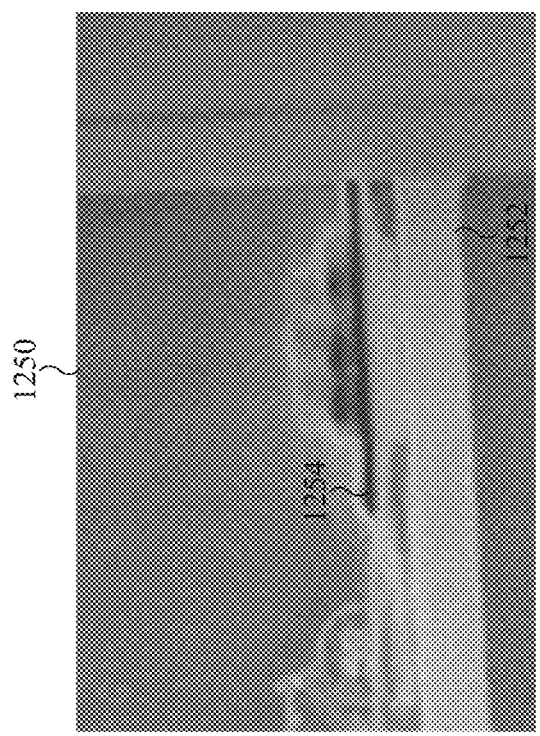
FIG. 12C illustrates an example gain map generated by the multi-frame processing operation of FIGS. 11A and 11B in accordance with this disclosure.
Figure 12B:
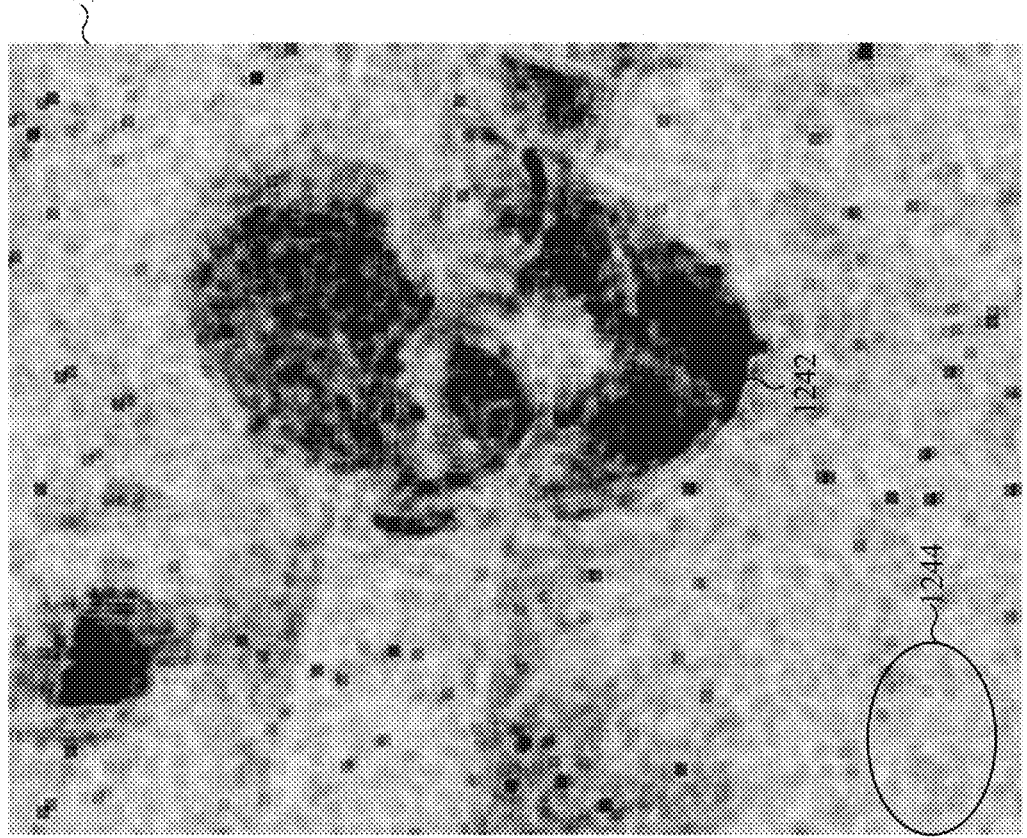
FIG. 12B illustrates an example motion map generated by the multi-frame processing operation of FIGS. 11A and 11B in accordance with this disclosure.

FIG. 12B illustrates an example motion map 1240 generated by the multi-frame processing operation of FIGS. 11A and 11B in accordance with this disclosure (during the process 1200 of FIG. 12). In this example, larger amounts of motion present between pixels in the aligned image frames result in darker pixels in the motion map, such as illustrated in an area 1242. In contrast, smaller or no amounts of motion present between pixels in the aligned image frames result in lighter pixels in the motion map, such as illustrated in an area 1244. As discussed above, areas in the motion map 1210 or 1240 that indicate motion generally correspond to areas of the blended image 1220 that include higher noise compared to areas in the motion map 1210 or 1240 that indicate little or no motion. In some embodiments, when the motion map 1210 or 1240 is normalized as discussed above, the area 1244 can have values close to one, while the area 1242 can have values close to zero.

A multi-frame blending operation 1212 blends or otherwise combines pixels from one or more of the aligned image frames that have the same exposure value. For example, if two or more of the multiple image frames 1202 were captured using the same exposure value, such as a similar shutter speed, a similar aperture value, or a similar camera sensor sensitivity value, the multi-frame blending operation 1212 blends these image frames that share the same exposure value together. Any suitable blending technique may be used here.

The aligned image frames are provided to a histogram matching operation 1214. The histogram matching operation 1214 generally operates to match a histogram of one or more non-reference image frames to a histogram of the reference frame 1204, such as by applying a suitable transfer function to the one or more non-reference image frames. For example, the histogram matching operation 1214 may operate to make the brightness level generally equal for the aligned image frames. This may typically involve increasing the brightness of a shorter-exposure image frame to substantially match the brightness of a longer-exposure image frame, although the converse may occur.

Outputs of the multi-frame blending operation 1212 and the histogram matching operation 1214 are provided to a labeling operation 1216. The labeling operation 1216 generally operates to identify different pixels or areas from the aligned image frames to be extracted and combined. For example, the labeling operation 1216 may identify and label pixels or areas that are very dark and very bright from the received image frames. The labeling operation 1216 generates at least one label map, which indicates how each pixel in a composite or final image being generated is extracted from the input image frames. For instance, due to the different exposure values at which the multiple image frames 1202 were captured, different frames can have areas that are correctly exposed, over-exposed, or under-exposed. As such, the labeling operation 1216 can generate the label map, which is used by a blending operation 1218 to blend the multiple frames of different exposure values together.

A tone mapping operation 1222 generally operates to apply a local and/or global tone mapping curve to the aligned image frames in order to brighten darker areas and increase image contrast in the aligned image frames. Various techniques for tone mapping are known in the art. Additionally, the tone mapping operation 1222 generates the gain map 1224. The gain map 1224 is generally based on the local and global brightness and contrast of the aligned image frames. In some embodiments, the gain map 1224 is used to compress the brightness of the blended HDR image. For example, the gain map 1224 can be used to compress the brightness of the blended HDR image from 16-bit values to 12-bit values. The pixels of the gain map 1224 correspond to values that represent brightness. For example, pixels with smaller values are often present in brighter areas in order to compress the brightness, and larger values are often present in darker areas to maintain or enhance the brightness. The tone mapping operation 1222 can be the same as or similar to the tone mapping/noise reduction operation 208 of FIGURE.

FIG. 12C illustrates an example gain map 1250 generated by the multi-frame processing operation of FIGS. 11A and 11B in accordance with this disclosure (during the process 1200 of FIG. 12). For ease of reference, the gain map 1250 corresponds to a region 1250*a* of the image frame 1126*b* of FIG. 11C. Here, a bright area 1252 in the gain map 1250 corresponds to an area with high values, which represent a dark portion of the region 1250*a* in the image frame 1126*b*. In contrast, a dark area 1254 in the gain map 1250 corresponds to areas with small values, which represent a bright portion of the region 1250*a* in the image frame 1126*b*.

The blending operation 1218 blends different images together based on the labeling from the labeling operation 1216 and the tone mapping from the tone mapping operation 1222 in order to produce at least one image of a scene, such as the blended image 1220. The blended image 1220 generally represents a blend of the multiple image frames 1202, where each pixel in the blended image 1220 is extracted from one of the multiple image frames 1202 (depending on the corresponding value in the label map). As discussed above, the blended image 1220 is not the final image due to artifacts within the blended image 1220 (since a UDC was used to capture the multiple image frames 1202).

Although FIG. 12A illustrates one example of a process 1200 for a multi-frame processing operation of FIGS. 11A and 11B, various changes may be made to FIG. 12A. For example, while shown as a specific sequence of operations, various operations shown in FIG. 12A could overlap, occur in parallel, occur in a different order, or occur any number of times. Also, the specific operations shown in FIG. 12A are examples only, and other techniques could be used to perform each of the operations shown in FIG. 12A. Although FIGS. 12B and 12C illustrate various maps generated by the multi-frame processing operation of FIGS. 11A and 11B, various changes may be made to FIGS. 12B and 12C. For example, FIGS. 12B and 12C are merely meant to illustrate examples of the types of results that could be obtained using the approaches described in this disclosure. Obviously, maps can vary widely, and the results obtained using the approaches described in this patent document can also vary widely depending on the circumstances.

Figure 13A:
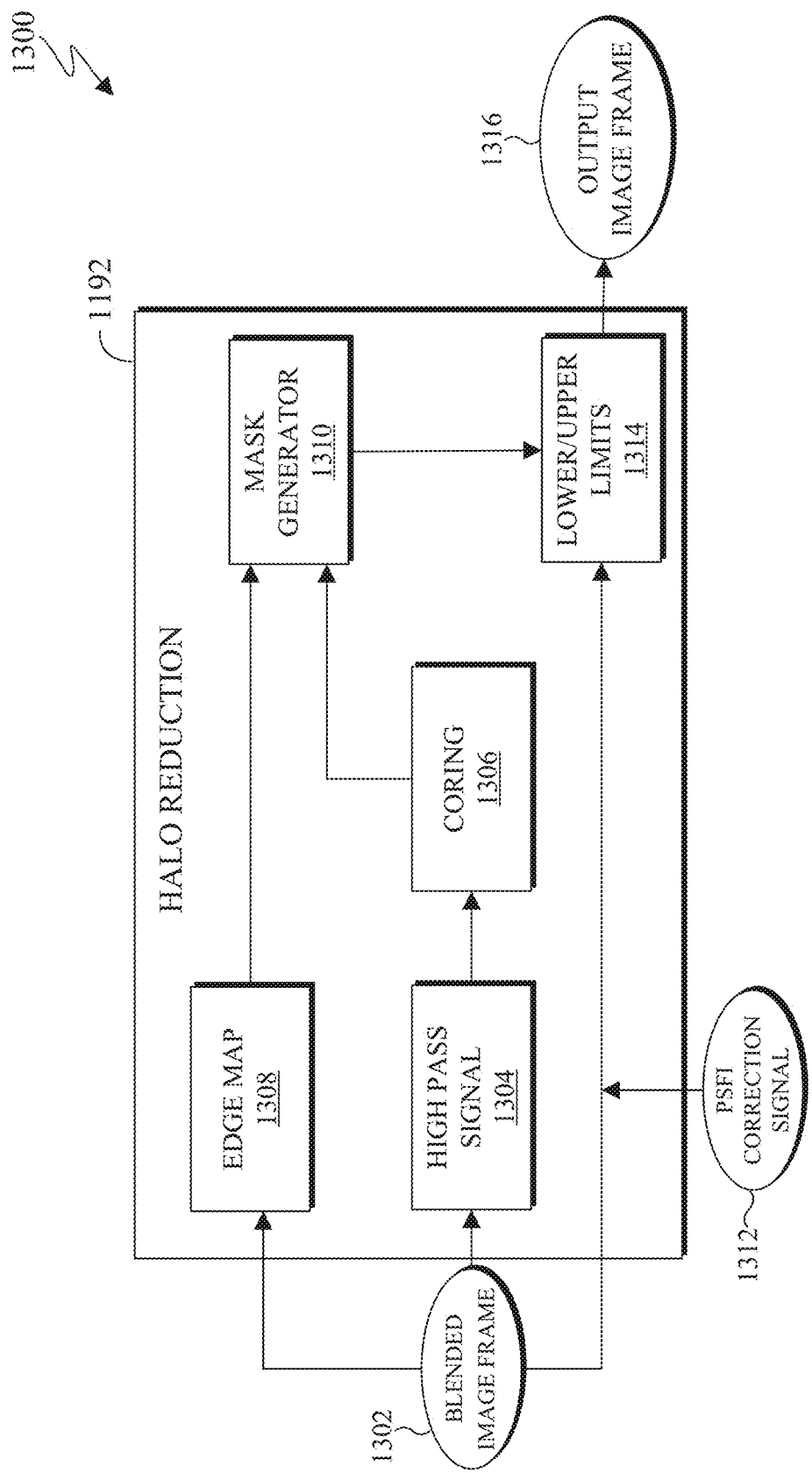
FIG. 13A illustrates an example process for halo reduction in the process of FIG. 11B in accordance with this disclosure.
Figure 13B:
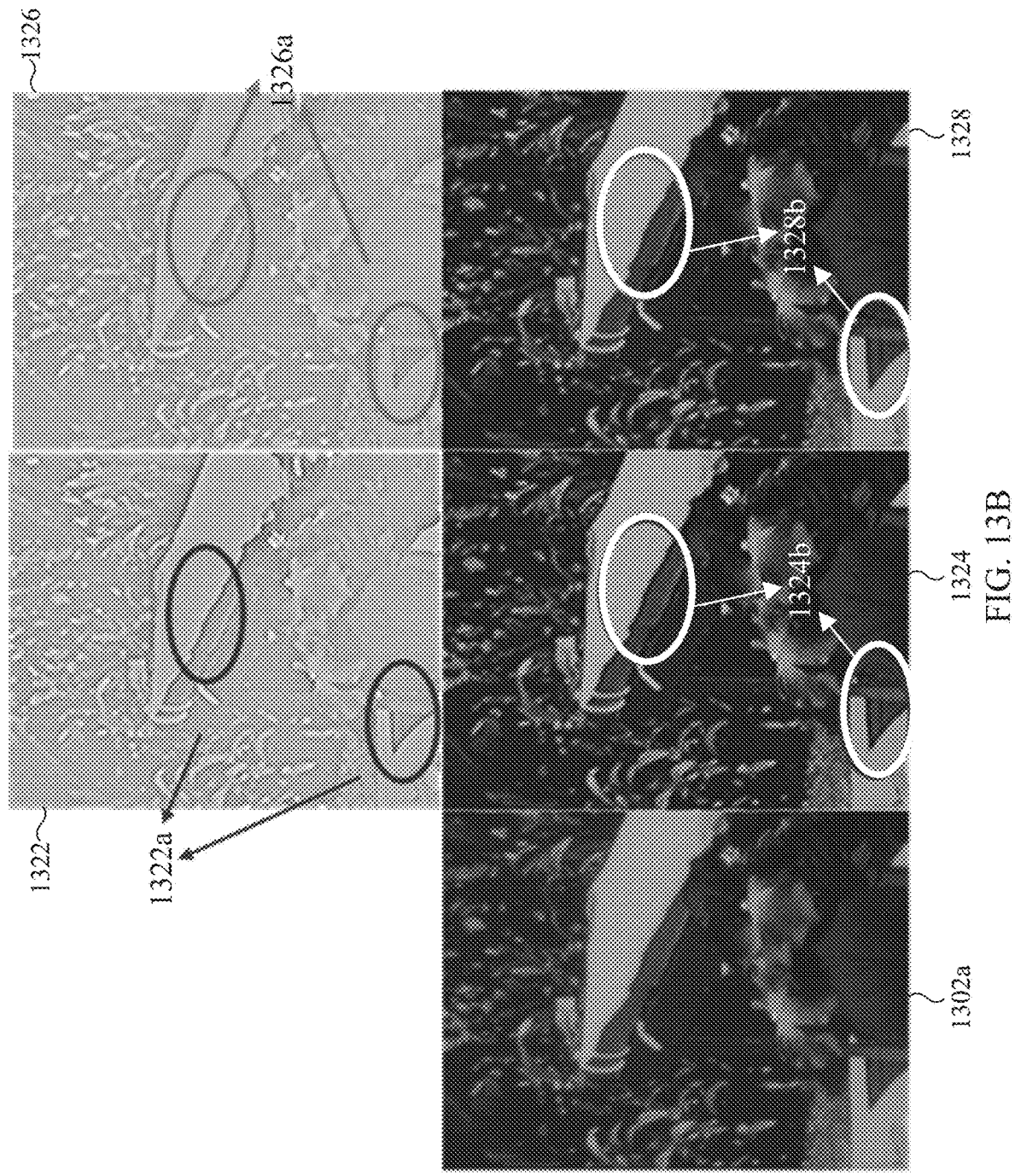
FIG. 13B illustrates an example for removing halo reduction in the process of FIG. 11B in accordance with this disclosure.

FIG. 13A illustrates an example process 1300 for halo reduction in the process 1100*b* of FIG. 11B in accordance with this disclosure. FIG. 13B illustrates an example for removing halo reduction in the process of FIG. 11B in accordance with this disclosure. For ease of explanation, the process 1300 shown in FIG. 13A is described as being performed using the electronic device 101 shown in FIG. 1. However, the process 1300 shown in FIG. 13A could be used with any other suitable electronic device and in any suitable system, such as when performed by the server 106.

The process 1300 is generally used to remove halo artifacts from an image, such as a blended image frame 1302. For example, the PSFI operation 1130 of FIGS. 11A and 11B can create bright and dark halo artifacts due to over-sharpening certain areas of a blended image. The process 1300 obtains a PSFI correction signal 1312 generated by the PSFI correction signal operation 1150 of FIGS. 11A and 11B. The PSFI correction signal 1312 can be the same as or similar to the PSFI correction signal 1152 of FIGS. 11A and 11B. The process 1300 uses the PSFI correction signal 1312 to identify areas where sharpening occurred from the PSFI operation 1130 and limit sharpening in certain areas where halos would likely occur based on bright and dark halo masks.

In FIG. 13A, the blended image frame 1302 may be the same as or similar to the blended output image 1122, which was generated by the MFP operation 1120 of FIGS. 11A and 11B. The blended image frame 1302 may also be the same as or similar to the blended image 1220 of FIG. 12A. The blended image frame 1302*a* of FIG. 13B illustrates an example of the blended image frame 1302. Here, the blended image frame 1302*a* corresponds to an image frame that is input into the PSFI operation 1130 of FIGS. 11A and 11B.

The blended image frame 1302 can be provided to a high-pass signal operation 1304. The high-pass signal operation 1304 can be the same as or similar to the high-pass signal operation 304 of FIG. 3A. The high-pass signal operation 1304 makes the blended image frame 1302 appear sharper by emphasizing fine details in the image. A coring operation 1306 can perform any suitable noise reduction to the high-pass signal. The coring operation 1306 can be the same as or similar to the coring operation 306 of FIG. 3A. The blended image frame 1302 can also be provided to an edge map operation 1308. The edge map operation 1308 can be the same as or similar to the edge map operation 308 of FIG. 3B. The edge map operation 308 can perform any suitable edge map generation process. For example, edge map operation 308 can use a canny edge map technique to generate the edge map. The edge map operation 1308 generates an edge map that indicates edges within the blended image frame 1302. In some embodiments, the edge map operation 1308 identifies edges within the image frame 1302 due to sudden changes in brightness.

The edge map and the output of the coring operation 1306 are provided to a mask generator 1310. The mask generator 1310 can be the same as or similar to the mask generator 314 of FIG. 3B. The mask generator 1310 generates a bright halo mask and a dark halo mask. The bright and dark halo masks represent two single-sided masks for bright and dark halo suppression, respectively. For example, the bright halo mask indicates the brighter sides of edges of the edge map, and the dark halo mask indicates the darker sides of edges of the edge map. In some embodiments, to generate the bright halo mask and the dark halo mask, the mask generator 1310 identifies the brighter side and the darker side of each edge of the edge map using the high-pass signal that is smoothed from the coring operation 1306. Since an edge indicates a transition from bright to dark or dark to bright, the high-pass signal can be used to identify the darker side and the brighter side of an edge. For example, the high-pass signal is positive (greater than zero) on the brighter side of an edge due to a transition from bright to dark. The high-pass signal is negative (less than zero) on the darker side of an edge due to a transition from dark to bright.

The bright and dark halo masks generated by the mask generator 1310 are used to limit the sharpening process at certain areas to reduce the appearance of halos in the sharpened image. For example, the bright halo mask indicates where a bright halo will most likely appear due to the PSFI operation 1130 of FIGS. 11A and 11B, so the bright halo mask is used to indicate an upper sharpening limit. Similarly, the dark halo mask indicates where a dark halo will most likely appear due to the PSFI operation 1130 of FIGS. 11A and 11B, so the dark halo mask is used to indicate a lower sharpening limit. The bright halo mask and the dark halo mask indicate how much sharpening can be performed without creating a halo. For example, the bright halo mask and the dark halo mask indicate respective levels of sharpening that (if passed) would lead to the creation of a corresponding bright or dark halo artifact.

As described above, to generate the bright halo mask, a sliding window of a predetermined size can move across the blended image frame 1302 to identify a maximum brightness value in that area. For example, if the window size is 3 pixels by 3 pixels, the sliding window identifies the largest luma channel value of the nine pixels within the window, and the largest luma channel value is the upper limit for the bright halo mask. To generate the dark halo mask, a sliding window of a predetermined size can move across the input image 302 to identify a minimum brightness value in that area. For example, if the window size is 3 pixels by 3 pixels, the sliding window identifies the smallest luma channel value of the nine pixels within the window, and the smallest luma channel value is the lower limit for the dark halo mask. In other embodiments, other window sizes can be used (such as 4 pixels by 4 pixels), or the window can be asymmetrical.

The lower/upper limits operation 1314 limits sharpening based on the generated masks and the PSFI correction signal 1312 in order to avoid artifacts, such as bright and dark halos, that were created by the PSFI operation 1130 of FIGS. 11A and 11B. An image frame 1324 of FIG. 13B illustrates an example output image from the PSFI operation 1130, which includes bright and dark halos 1324*b* due to sharpening the image frame 1302*a* by the PSFI operation 1130.

The PSFI correction signal 1312 here is based on a comparison of the input and the output of the PSFI operation 1130. For example, the PSFI correction signal 1312 can be based on the difference between the image frame 1302*a* (which can correspond to the input into the PSFI operation 1130) and the image frame 1324 (which can correspond to the output image of the PSFI operation 1130). An example PSFI correction signal 1312 is illustrated in the image frame 1322 of FIG. 13B. As can be seen here, the image frame 1322 also includes bright and dark halos 1322*a*, which correspond to the bright and dark halos 1322*b* of the image frame 1324.

The lower/upper limits operation 1314 can identify locations of the bright and dark halos within the PSFI correction signal 1312 using the bright and dark halo masks. After identifying locations of the bright and dark halos within the PSFI correction signal 1312, the lower/upper limits operation 1314 can modify the PSFI correction signal 1312 by reducing sharpening in areas that yield the bright or dark halos. An example image frame 1326 of FIG. 13B illustrates the modified PSFI correction signal after the lower/upper limits operation 1314 reduces sharpening in areas as indicated by the bright and dark halo masks. The modified PSFI correction signal can be applied to the blended image frame 1302 to generate the output image frame 1316. The image frame 1328 of FIG. 13B can correspond to output image frame 1316. As can be seen here, the image frame 1328 is sharper than the image frame 1320a and lacks the bright and dark halos 1324b that were generated by the PSFI operation 1130.

Although FIG. 13A illustrates one example of a process 1300 for halo reduction in the process 1100b of FIG. 11B, various changes may be made to FIG. 13A. For example, while shown as a specific sequence of operations, various operations shown in FIG. 13A could overlap, occur in parallel, occur in a different order, or occur any number of times. Also, the specific operations shown in FIG. 13A are examples only, and other techniques could be used to perform each of the operations shown in FIG. 13A. Although FIG. 13B illustrates one example for removing halo reduction in the process 1100b of FIG. 11B, various changes may be made to FIG. 13B. For example, FIG. 13B is merely meant to illustrate examples of the types of results that could be obtained using the approaches described in this disclosure. Obviously, the results obtained using the approaches described in this patent document can also vary widely depending on the circumstances.

Figure 14A:
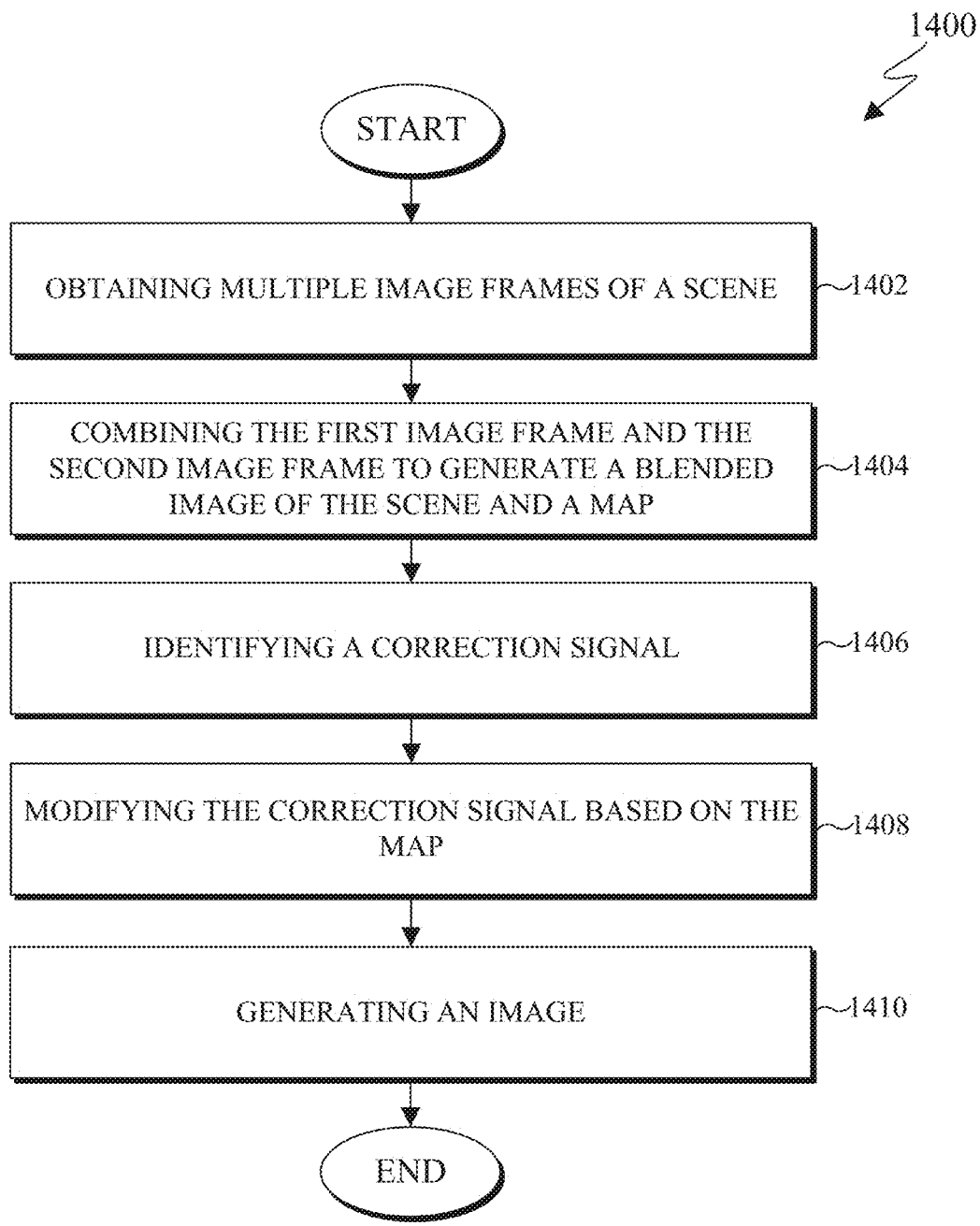
FIGS. 14A and 14B illustrate example methods for processing an image in accordance with this disclosure.
Figure 14B:
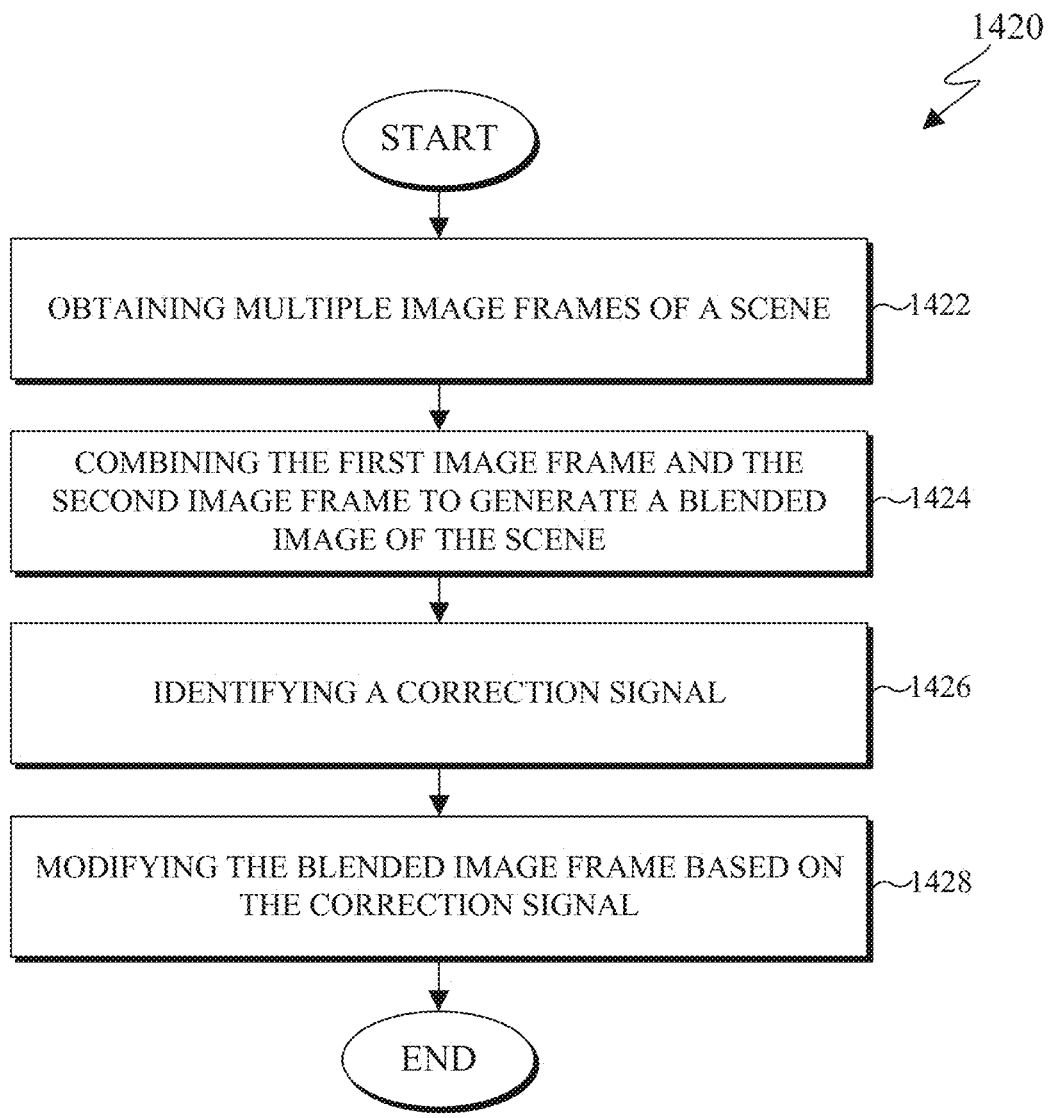

FIGS. 14A and 14B illustrate example methods 1400 and 1420 for processing an image in accordance with this disclosure. For ease of explanation, the methods 1400 and 1420 shown in FIGS. 14A and 14B are described as being performed using the electronic device 101 shown in FIG. 1. However, the methods 1400 and 1420 shown in FIGS. 14A and 14B could be used with any other suitable electronic device and in any suitable system, such as when performed by the server 106.

As shown in FIG. 14A, in step 1402, the electronic device 101 obtains multiple image frames of a scene using at least one sensor, such as one or more sensors 180 or one or more UDCs 1112. The obtained images can include visual content. In some embodiments, the multiple image frames include first and second image frames. In step 1404, the electronic device 101 combines the first and second image frames to generate a blended image of the scene. To generate the blended image of the scene, the electronic device 101 can pre-process the first and second image frames in any suitable manner. For example, the first and second image frames can be aligned. This could include, for example, the processor 120 of the electronic device 101 selecting one of the image frames as a reference image frame and modifying the other of the image frames to align with the reference image frame. As another example, one or more of the image frames can be processed so that the image frames have substantially similar brightness levels. This could include, for example, the processor 120 of the electronic device 101 performing histogram matching to substantially match the brightness of the aligned non-reference image frames to the brightness of the aligned reference image frame. As yet another example, one or more of the image frames can be processed so that the image frames have substantially similar tones. This could include, for example, the processor 120 of the electronic device 101 applying a global tone mapping curve to the aligned non-reference image frame in order to brighten darker areas and increase image contrast in that image frame. Note, however, that any other or additional pre-processing may occur here. When generating the blended image of the scene, the electronic device 101 also generates a map that indicates differences between the first image frame and the second image frame. In some embodiments, the map can be a motion map that indicates the locations of motion between pixels of the multiple image frames and/or a gain map that indicates bright areas and dark areas.

In step 1406, the electronic device 101 identifies a correction signal. The correction signal is based on a comparison of the blended image and an output of a PSFI operation, which increases sharpness and removes certain artifacts. In some embodiments, the correction signal indicates differences between the blended image and an output of a PSFI operation. In step 1408, the electronic device 101 modifies the correction signal based on the map. For example, when the map is a motion map, the electronic device 101 can normalize the motion map and perform an element-wise multiplication between the normalized motion map and the correction signal to generate the modified correction signal. As another example, when the map is a gain map, the electronic device 101 can normalize the gain map, invert the normalized gain map, and perform an element-wise multiplication between the inverted normalized gain map and the correction signal to generate the modified correction signal. In step 1410, the electronic device 101 combines the blended image with the modified correction signal to generate a final image of the scene. The final image of the scene can be stored in the memory 130, displayed on the display 160, or used in any other or additional manner.

As shown in FIG. 14B, in step 1422, the electronic device 101 obtains multiple image frames of a scene using at least one sensor, such as one or more sensors 180 or one or more UDCs 1112. The obtained images can include visual content. In some embodiments, the multiple image frames include first and second image frames. In step 1424, the electronic device 101 combines the first and second image frames to generate a blended image of the scene. To generate the blended image of the scene, the electronic device 101 can pre-process the first and second image frames in any suitable manner. For example, the first and second image frames can be aligned. This could include, for example, the processor 120 of the electronic device 101 selecting one of the image frames as a reference image frame and modifying the other of the image frames to align with the reference image frame. As another example, one or more of the image frames can be processed so that the image frames have substantially similar brightness levels. This could include, for example, the processor 120 of the electronic device 101 performing histogram matching to substantially match the brightness of the aligned non-reference image frames to the brightness of the aligned reference image frame. As yet another example, one or more of the image frames can be processed so that the image frames have substantially similar tones. This could include, for example, the processor 120 of the electronic device 101 applying a global tone mapping curve to the aligned non-reference image frame in order to brighten darker areas and increase image contrast in that image frame. Note, however, that any other or additional pre-processing may occur here. When generating the blended image of the scene, the electronic device 101 also generates a map that indicates differences between the first image frame and the second image frame. In some embodiments, the map can be a motion map that indicates the locations of motion between pixels of the multiple image frames and/or a gain map that indicates bright areas and dark areas.

In step 1426, the electronic device 101 identifies a correction signal. The correction signal is based on a comparison of the blended image and an output of a PSFI operation, which increases sharpness and removes certain artifacts based on the UDC. In some embodiments, the correction signal indicates differences between the blended image and an output of a PSFI operation. In step 1428, the electronic device 101 modifies the blended image based on the correction signal. In some embodiments, the electronic device 101 modifies the blended image to perform a sharpness enhancement operation. In other embodiments, the electronic device 101 modifies the blended image to perform a global noise reduction operation. In yet other embodiments, the electronic device 101 modifies the blended image to perform a halo reduction operation. For example, to perform a halo reduction operation, the electronic device 101 generates an edge map from the blended image, where the edge map indicates edges of the visual content within the image. The electronic device 101 also generates a bright halo mask and a dark halo mask based on the edge map, where the bright halo mask and the dark halo mask indicate locations within the correction signal that could include halos. As such, the electronic device 101 modifies the correction signal to reduce the sharpening in the areas that include halos.

Although FIGS. 14A and 14B illustrate examples of methods 1400 and 1420 for processing an image, various changes may be made to FIGS. 14A and 14B. For example, while shown as a series of steps, various steps in the FIGS. 14A and 14B may overlap, occur in parallel, occur in a different order, or occur any number of times. As another example, steps may be omitted or replaced by other steps.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method for image sharpening, the method comprising:
   obtaining, using at least one sensor of an electronic device, an image that includes visual content;
   generating an edge map that indicates edges of the visual content within the image;
   applying a high-pass signal and an adaptive gain based on the edge map to sharpen the image;
   generating a bright halo mask and a dark halo mask based on the edge map, wherein the bright halo mask indicates an upper sharpening limit and the dark halo mask indicates a lower sharpening limit; and
   modifying a level of sharpening at one or more of the edges within the sharpened image to provide halo artifact reduction based on the bright halo mask and the dark halo mask.

2. The method of claim 1, further comprising:
   after the high-pass signal is applied to the image, removing noise within the image to smooth the image;
   wherein applying the adaptive gain comprises applying the adaptive gain to the smoothed image; and
   wherein modifying the level of sharpening comprises reducing an amount of sharpening at the edges within the sharpened image based on the bright halo mask and the dark halo mask.

3. The method of claim 1, wherein applying the adaptive gain comprises:
   applying a specified level of gain at a center of an edge as indicated by the edge map; and
   reducing the specified level of gain incrementally as distance from the center of the edge increases.

4. The method of claim 1, wherein generating the bright halo mask and the dark halo mask comprises:
   selecting a specified edge from the edge map;
   identifying a location of the specified edge in the image; and
   determining that a first side of the specified edge is brighter than a second side of the specified edge; and
   wherein the bright halo mask corresponds to the first side of the specified edge and the dark halo mask corresponds to the second side of the specified edge.

5. The method of claim 1, further comprising:
   after the high-pass signal is applied to the image, removing noise within the image;
   wherein generating the bright halo mask and the dark halo mask comprises:
      generating the bright halo mask to indicate locations where the high-pass signal is positive; and
      generating the dark halo mask to indicate locations where the high-pass signal is negative; and
   wherein modifying the level of sharpening comprises reducing the level of sharpening at one or more edges according to the bright halo mask and the dark halo mask.

6. The method of claim 1, further comprising:
   identifying an edge density value at a portion of the image;
   comparing the edge density value to a threshold; and
   reducing halo control at the portion of the image based on a comparison of the edge density value to the threshold.

7. The method of claim 6, further comprising:
   performing text segmentation using the image;
   determining that the portion of the image includes text based on the text segmentation; and
   maintaining the halo control around a region of the text.

8. A method for image sharpening, the method comprising:
   obtaining an image of a scene using at least one sensor of an electronic device;
   applying multiple Gaussian filtering operations to the obtained image, the Gaussian filtering operations changing different frequencies of an input signal of the obtained image;
   generating multiple intermediate sharpened images using the obtained image, wherein generating the multiple intermediate sharpened images comprises, for each of the multiple Gaussian filtering operations, performing non-local filtering for noise reduction to generate one of the intermediate sharpened images; and
   combining portions of the multiple intermediate sharpened images and the obtained image to generate a sharpened image of the scene.

9. The method of claim 8, wherein applying the multiple Gaussian filtering operations comprises:
   performing a first Gaussian filtering operation based on the input signal of the obtained image to generate a first filtered signal; and
   performing a second Gaussian filtering operation based on the first filtered signal.

10. A method for image processing, the method comprising:
    obtaining multiple image frames of a scene using at least one under-display camera (UDC) of an electronic device, the multiple image frames including a first image frame and a second image frame that are captured using different exposures;
    combining the first image frame and the second image frame to generate a blended image of the scene and a map, wherein the map is based on at least one of the multiple image frames;

identifying a correction signal based on a comparison of the blended image and an output of a point spread function inversion (PSFI) process for increasing sharpness and removing artifacts;

modifying the correction signal based on the map; and generating an image of the scene based on the modified correction signal and the blended image of the scene.

11. The method of claim 10, wherein the correction signal represents differences between an input to the PSFI process and the output of the PSFI process.

12. The method of claim 10, further comprising:

modifying the map by normalizing the map; and modifying the correction signal by performing element-wise multiplication with the modified map.

13. The method of claim 10, wherein:

the map comprises a motion map;

combining the first image frame and the second image frame comprises aligning the first image frame and the second image frame; and generating the motion map occurs as part of the aligning of the first image frame and the second image frame, wherein the motion map indicates motion between the first image frame and the second image frame.

14. The method of claim 10, wherein:

the map comprises a gain map;

generating the gain map comprises:

aligning the first image frame with the second image frame; and processing the aligned image frames using tone mapping to generate the gain map; and modifying the correction signal is based on an inverse of the gain map.

15. The method of claim 10, wherein the map comprises at least one of a gain map and a motion map.

16. An electronic device comprising:

a display;

at least one image sensor positioned under the display; and at least one processor operatively connected to the display and the at least one image sensor, the at least one processor configured to:

obtain multiple image frames of a scene using the at least one image sensor, the multiple image frames including a first image frame and a second image frame that are captured using different exposures;

combine the first image frame and the second image frame to generate a blended image of the scene and a map, wherein the map is based on at least one of the multiple image frames;

identify a correction signal based on a comparison of the blended image and an output of a point spread function inversion (PSFI) process for increasing sharpness and removing artifacts;

modify the correction signal based on the map; and generate an image of the scene based on the modified correction signal and the blended image of the scene.

17. The electronic device of claim 16, wherein the correction signal represents differences between an input to the PSFI process and the output of the PSFI process.

18. The electronic device of claim 16, wherein the at least one processor is further configured to:

normalize the map; and perform element-wise multiplication with the normalized map to modify the correction signal.

19. The electronic device of claim 16, wherein:

the map comprises a motion map;

to combine the first image frame and the second image frame, the at least one processor is configured to align the first image frame and the second image frame; and the at least one processor is further configured to generate the motion map as part of the aligning of the first image frame and the second image frame, wherein the motion map indicates motion between the first image frame and the second image frame.

20. The electronic device of claim 16, wherein:

the map comprises a gain map;

to generate the gain map, the at least one processor is configured to:

align the first image frame and the second image frame; and process the aligned image frames using tone mapping to generate the gain map; and the at least one processor is configured to modify the correction signal based on an inverse of the gain map.

21. The electronic device of claim 16, wherein the map comprises at least one of a gain map and a motion map.

22. A method for image processing, the method comprising:

obtaining multiple image frames of a scene using at least one under-display camera (UDC) of an electronic device, the multiple image frames including a first image frame and a second image frame that are captured using different exposures;

combining the first image frame and the second image frame to generate a blended image of the scene;

identifying a correction signal based on a comparison of the blended image and an output of a point spread function inversion (PSFI) process for increasing sharpness and removing artifacts; and modifying the blended image based on the correction signal to generate an image of the scene.

23. The method of claim 22, wherein the correction signal comprises a matrix that represents differences between an input to the PSFI process and the output of the PSFI process.

24. The method of claim 22, wherein modifying the blended image further comprises:

generating an edge map that indicates edges of visual content within the scene based on the blended image;

generating a bright halo mask and a dark halo mask based on the edge map, wherein the bright halo mask indicates an upper sharpening limit and the dark halo mask indicates a lower sharpening limit; and modifying a level of sharpening at one or more of the edges within the blended image to provide halo artifact reduction based on the bright halo mask and the dark halo mask.

25. The method of claim 24, further comprising applying a high-pass signal to the blended image;

wherein generating the bright halo mask and the dark halo mask comprises:

generating the bright halo mask to indicate locations where the high-pass signal is positive; and generating the dark halo mask to indicate locations where the high-pass signal is negative.

26. The method of claim 24, further comprising:

modifying the correction signal by adjusting a level of sharpening at the one or more of the edges before the blended image is modified by the correction signal to provide halo artifact reduction based on the bright halo mask and the dark halo mask.

27. The method of claim 22, further comprising:

processing the combined first and second image frames using tone mapping to generate a gain map; and modifying the blended image based on the correction signal and the gain map to provide global noise reduction in the image of the scene.

28. The method of claim 22, further comprising:
combining the first image frame and the second image frame to generate the blended image of the scene and a motion map, wherein the motion map indicates motion between the first image frame and the second image frame; and
modifying the blended image based on the correction signal and the motion map to provide global noise reduction in the image of the scene.

29. An electronic device comprising:
a display;
at least one image sensor positioned under the display; and
at least one processor operatively connected to the display and the at least one image sensor, the at least one processor configured to:
obtain multiple image frames of a scene using the at least one image sensor, the multiple image frames including a first image frame and a second image frame that are captured using different exposures;
combine the first image frame and the second image frame to generate a blended image of the scene;
identify a correction signal based on a comparison of the blended image and an output of a point spread function inversion (PSFI) process for increasing sharpness and removing artifacts; and
modify the blended image based on the correction signal to generate an image of the scene.

30. The electronic device of claim 29, wherein the correction signal comprises a matrix that represents differences between an input to the PSFI process and the output of the PSFI process.

31. The electronic device of claim 29, wherein, to modify the blended image, the at least one processor is configured to:
generate an edge map that indicates edges of visual content within the scene based on the blended image;
generate a bright halo mask and a dark halo mask based on the edge map, wherein the bright halo mask indicates an upper sharpening limit and the dark halo mask indicates a lower sharpening limit; and
modify a level of sharpening at one or more of the edges within the blended image to provide halo artifact reduction based on the bright halo mask and the dark halo mask.

32. The electronic device of claim 31, wherein:
the at least one processor is further configured to apply a high-pass signal to the blended image; and
to generate the bright halo mask and the dark halo mask, the at least one processor is configured to:
generate the bright halo mask to indicate locations where the high-pass signal is positive; and
generate the dark halo mask to indicate locations where the high-pass signal is negative.

33. The electronic device of claim 31, wherein the at least one processor is further configured, before the blended image is modified by the correction signal, to modify the correction signal by adjusting a level of sharpening at the one or more of the edges to provide halo artifact reduction based on the bright halo mask and the dark halo mask.

34. The electronic device of claim 29, wherein the at least one processor is further configured to:
process the combined first and second image frames using tone mapping to generate a gain map; and
modify the blended image based on the correction signal and the gain map to provide global noise reduction in the image of the scene.

35. The electronic device of claim 29, the at least one processor is further configured to:
combine the first image frame and the second image frame to generate the blended image of the scene and a motion map, wherein the motion map indicates motion between the first image frame and the second image frame; and
modify the blended image based on the correction signal and the motion map to provide global noise reduction in the image of the scene.

36. The method of claim 8, wherein each of the multiple Gaussian filtering operations amplifies a different frequency of the obtained image.

* * * * *